(12) United States Patent
Pelegero

(10) Patent No.: US 8,838,503 B2
(45) Date of Patent: Sep. 16, 2014

(54) UNIFIED IDENTITY VERIFICATION

(75) Inventor: Rene M. Pelegero, Woodinville, WA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 12/347,907

(22) Filed: Dec. 31, 2008

(65) Prior Publication Data

US 2010/0145860 A1   Jun. 10, 2010

Related U.S. Application Data

(60) Provisional application No. 61/138,102, filed on Dec. 16, 2008, provisional application No. 61/120,808, filed on Dec. 8, 2008.

(51) Int. Cl.
| | |
|---|---|
| G06Q 20/00 | (2012.01) |
| G06Q 20/38 | (2012.01) |
| G06Q 20/30 | (2012.01) |
| G06Q 20/40 | (2012.01) |
| G06Q 20/32 | (2012.01) |
| G06Q 20/20 | (2012.01) |
| G06Q 20/12 | (2012.01) |

(52) U.S. Cl.
CPC ............ *G06Q 20/40* (2013.01); *G06Q 20/3829* (2013.01); *G06Q 20/30* (2013.01); *G06Q 20/3223* (2013.01); *G06Q 20/20* (2013.01); *G06Q 20/12* (2013.01)
USPC .................. 705/75; 705/35; 705/39; 705/66; 705/67

(58) Field of Classification Search
USPC .................................... 705/35, 39, 66, 67, 75
See application file for complete search history.

(56) References Cited

U.S. PATENT DOCUMENTS

| | | | |
|---|---|---|---|
| 5,661,803 A | 8/1997 | Cordery et al. | |
| 5,812,666 A | 9/1998 | Baker et al. | |
| 5,943,423 A * | 8/1999 | Muftic | 705/67 |
| 6,385,596 B1 | 5/2002 | Wiser et al. | |
| 6,659,259 B2 * | 12/2003 | Knox et al. | 194/217 |
| 6,868,403 B1 | 3/2005 | Wiser et al. | |
| 6,970,853 B2 | 11/2005 | Schutzer | |
| 7,017,188 B1 | 3/2006 | Schmeidler et al. | |
| 7,369,999 B2 | 5/2008 | DuBois et al. | |
| 8,214,291 B2 | 7/2012 | Pelegero et al. | |
| 8,498,940 B2 | 7/2013 | Pelegero et al. | |

(Continued)

FOREIGN PATENT DOCUMENTS

WO   WO-2010078522 A1   7/2010

OTHER PUBLICATIONS

U.S. Appl. No. 11/962,757, Non-Final Office Action mailed Sep. 2, 2009, 16 pgs.

(Continued)

*Primary Examiner* — Calvin Cheung
(74) *Attorney, Agent, or Firm* — Schwegman Lundberg & Woessner, P.A.

(57) ABSTRACT

In some example embodiments, a system and method is shown that includes receiving a purchase request through an Electronic Payment Financial Network (EPFN), the purchase request including a token to identify a merchant server. The system and method further includes comparing the token against a merchant identifier value to determine that that token is assigned to the merchant server. Additionally, the system and method includes transmitting a purchase request authorization authorizing an online transaction, where the token and merchant identifier value are equivalent.

16 Claims, 31 Drawing Sheets

(56) References Cited

U.S. PATENT DOCUMENTS

| | | | |
|---|---|---|---|
| 2003/0061170 A1* | 3/2003 | Uzo | 705/64 |
| 2003/0061203 A1* | 3/2003 | Hayduk, Jr. | 707/3 |
| 2003/0187787 A1* | 10/2003 | Freund | 705/39 |
| 2004/0139028 A1* | 7/2004 | Fishman et al. | 705/67 |
| 2005/0065881 A1* | 3/2005 | Li et al. | 705/40 |
| 2005/0119978 A1 | 6/2005 | Ates | |
| 2005/0131752 A1 | 6/2005 | Gracie et al. | |
| 2006/0015463 A1* | 1/2006 | Gupta et al. | 705/52 |
| 2006/0020542 A1* | 1/2006 | Litle et al. | 705/40 |
| 2006/0074765 A1 | 4/2006 | Crawford et al. | |
| 2006/0204051 A1 | 9/2006 | Holland | |
| 2007/0215689 A1* | 9/2007 | Algiene | 235/379 |
| 2008/0072293 A1 | 3/2008 | D'Urso | |
| 2008/0162295 A1 | 7/2008 | Bedier | |
| 2008/0189214 A1* | 8/2008 | Mueller et al. | 705/65 |
| 2008/0228653 A1 | 9/2008 | Holdsworth | |
| 2009/0048953 A1* | 2/2009 | Hazel et al. | 705/35 |
| 2009/0106150 A1 | 4/2009 | Pelegero et al. | |
| 2012/0209733 A1 | 8/2012 | Pelegero et al. | |
| 2013/0269004 A1 | 10/2013 | Pelegero et al. | |

OTHER PUBLICATIONS

U.S. Appl. No. 11/962,757, Response filed Dec. 2, 2009 to Non Final Office Action mailed Sep. 2, 2009, 11 pgs.

"Card HQ, Online Resources", *Online Resources Corporation*, [Online]. Retrieved from the Internet: <URL: http://www.orcc.com/products/ebanking/banking/cardhq.asp>, (2008), 2 pgs.

"Security Assertion Markup Language", *From Wikipedia, the free encyclopedia*, [Online]. Retrieved from the Internet: <URL: http://en.wikipedia.org/wiki/Saml>, (Sep. 26, 2008), 8 pgs.

"Why NYCE Plans to Test Two Online PIN Debit Systems in Parallel", *Digital Transactions*, [Online]. Retrieved from the Internet: <URL: http://www.digitaltransactions.net/newsstory.cfm?newsid=1995>, (Dec. 3, 2008), 3 pgs.

"U.S. Appl. No. 11/962,757, Advisory Action mailed Jun. 4, 2010", 3 pgs.

"U.S. Appl. No. 11/962,757, Final Office Action mailed Mar. 25, 2010", 15 pgs.

"U.S. Appl. No. 11/962,757, Response filed May 25, 2010 to Final Office Action mailed Mar. 25, 2010", 10 pgs.

"International Application Serial No. PCT/US2009/06963, Written Opinion mailed Mar. 4, 2010", 4 pgs.

"International Application Serial No. PCT/US2009/069963, International Search Report mailed Mar. 4, 2010", 4 pgs.

"U.S. Appl. No. 11/962,757, Response to Rule 312 Communication mailed Apr. 19, 2012", 2 pgs.

"U.S. Appl. No. 11/962,757, Response to Rule 312 Communication mailed May 4, 2012", 2 pgs.

"European Application Serial No. 09837215.4, Extended European Search Report mailed May 2, 2012", 6 pgs.

"European Application Serial No. 09837215.4, Office Action mailed Jun. 16, 2011", 2 pgs.

"European Application Serial No. 09837215.4, Response filed Sep. 19, 2011 to Office Action mailed Jun. 16, 2011", 11 pgs.

"U.S. Appl. No. 11/962,757, Issue Notification mailed Jun. 15, 2012", 1 pg.

"Australian Application Serial No. 2009334494, Examiner Report mailed Jun. 19, 2012", 3 pgs.

"European Application Serial No. 09837215.4, Response filed Nov. 15, 2012 to Extended Search Report mailed May 2, 2012", 17 pgs.

"U.S. Appl. No. 11/962,757, Non Final Office Action mailed Sep. 6, 2011", 17 pgs.

"International Application Serial No. PCT/US2009/069963, International Preliminary Report on Patentability mailed Jul. 14, 2011", 6 pgs.

"U.S. Appl. No. 11/962,757, 312 Amendment filed Apr. 11, 2012", 11 pgs.

"U.S. Appl. No. 13/453,492, Notice of Allowance mailed Mar. 27, 2013", 9 pgs.

"U.S. Appl. No. 13/453,492, Restriction Requirement mailed Mar. 7, 2013", 6 pgs.

"U.S. Appl. No. 13/453,492, Response filed Mar. 12, 2013 to Restriction Requirement mailed Mar. 7, 2013", 6 pgs.

"Australian Application Serial No. 2009334494, Notice of Acceptance mailed Jan. 9, 2013", 2 pgs.

"Australian Application Serial No. 2009334494, Response filed Dec. 18, 2012 to Examiner Report mailed Jun. 19, 2012", 18 pgs.

"Australian Application Serial No. 2013205575, Voluntary Amendment filed May 30, 2013", 9 pgs.

"European Application Serial No. 09837215.4, Office Action mailed May 6, 2013", 5 pgs.

"U.S. Appl. No. 11/962,757, Examiner Interview Summary mailed Jan. 3, 2012", 1 pg.

"U.S. Appl. No. 11/962,757, Final Office Action mailed Nov. 30, 2011", 5 pgs.

"U.S. Appl. No. 11/962,757, Notice of Allowance mailed Jan. 12, 2012", 9 pgs.

"U.S. Appl. No. 11/962,757, Response filed Jun. 25, 2010 to Advisory Action mailed Jun. 4, 2010", 11 pgs.

"U.S. Appl. No. 11/962,757, Response filed Nov. 4, 2011 to Non Final Office Action mailed Sep. 6, 2011", 16 pgs.

"U.S. Appl. No. 11/962,757, Response filed Dec. 21, 2011 to Final Office Action mailed Nov. 30, 2011", 13 pgs.

"U.S. Appl. No. 11/962,757 Examiner Interview Summary filed Aug. 15, 2010 by SLW", 1 pg.

"U.S. Appl. No. 11/962,757, Examiner Interview Summary mailed Aug. 17, 2010", 3 pgs.

"U.S. Appl. No. 11/962,757, Response filed Jun. 25, 2010 to Advisory Action mailed Jun. 4, 2010", 7 pgs.

"U.S. Appl. No. 13/910,872, Preliminary Amendment filed Aug. 15, 2013", 8 pgs.

"Canadian Application Serial No. 2,747,831, Office Action mailed Nov. 15, 2013", 2 pgs.

* cited by examiner

FIG. 17
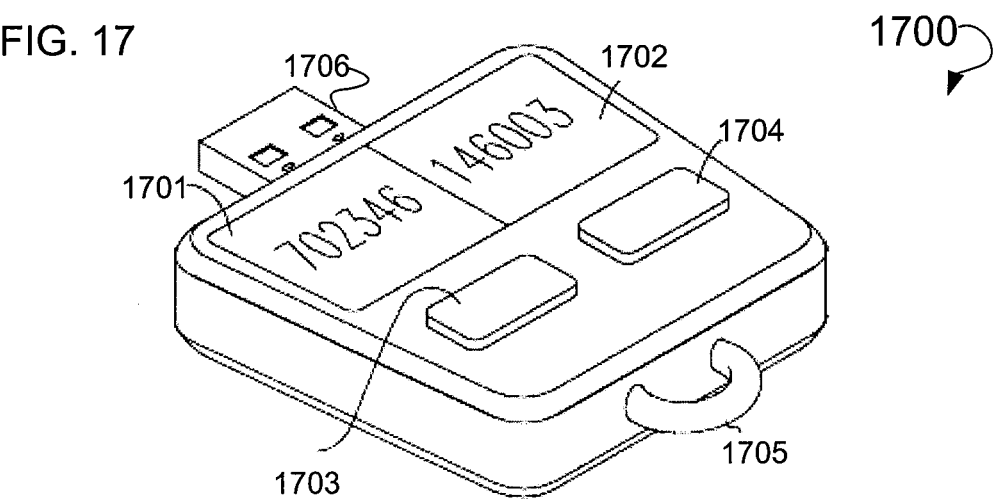
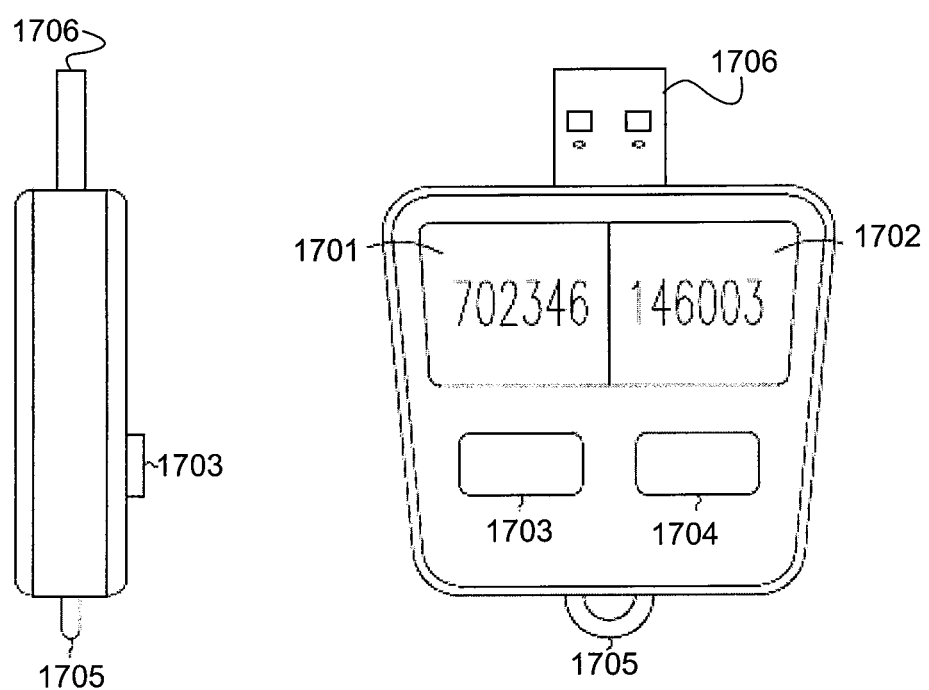

UNIFIED IDENTITY VERIFICATION

CROSS REFERENCE TO RELATED APPLICATIONS

This disclosure claims priority to the filing date of U.S. Provisional Patent Application Ser. No. 61/138,102, filed on Dec. 16, 2008 titled, "ONLINE PURCHASING IDENTIFIER." Further, this application claims priority to the filing date of U.S. Provisional Patent Application Ser. No. 61/120,808, filed on Dec. 8, 2008 titled, "UNIFIED IDENTITY VERIFICATION." This claim for priority is made under 35 U.S.C. 119(e). Additionally, the present application is related to U.S. patent application Ser. No. 11/962,757, filed on Dec. 21, 2007, titled "UNIFIED IDENTITY VERIFICATION." All three of these applications are commonly assigned to the assignee of the instant application, eBay, Inc., and all three applications are incorporated herein by reference in their entirety.

BACKGROUND

Online fraud may take the form of the unauthorized use of bank account, credit or debit card numbers to conduct purchases at an online merchant website. The information to conduct this online fraud may be obtained by fraudsters through hacking, the amassing of large quantities of private information and account numbers, or through the use of account number generators that can generate valid credit and debit card numbers. This online fraud is responsible for millions of dollars in losses for online merchants every year.

BRIEF DESCRIPTION OF THE DRAWINGS

Some embodiments are illustrated by way of example and not limitation in the figures of the accompanying drawings in which:

FIG. 17 is an illustration of a dual Time Based Rolling Encryption (TRBE) key fob, according to an example embodiment, used to generate a seed value that can be converted to a token.

DETAILED DESCRIPTION

In some example embodiments, a system and method is shown for using a token to address online fraud in an EPFN. In one example embodiment, the number that appears on a physical credit, debit cards, or a bank account number is replaced with an identifier (e.g., a token) that is generated by a depository financial institution server. In some example embodiments, this token is associated by an account holder with a merchant. An account holder is a person having an account with a depository financial institution that controls a depository financial institution server. The merchant, in one example embodiment, may use the token in facilitating an online commercial transactions engaged in by the account holder. An online commercial transaction includes a transaction in commerce conducted over a network.

In some example embodiments, account holders instruct their depository financial institution, and the servers they control, to generate a token and send it to a merchant/merchant aggregator server. This token may be sent over a network. These instructions can be generated by the account holder through the depository financial institution server. A depository financial institution includes, for example, a national, state of thrift chartered bank, a credit union, a savings and loan, or other suitable institution.

Some example embodiments may include an enrollment program to facilitate the use of tokens by account holders in online commercial transactions. In one example embodiment, pre-enrollment is used by a depository financial institution to facilitate participation by account holders. In another example embodiment, account holder enrollment is facilitated by merchants who solicit account holders to utilize tokens in conducting online commercial transactions.

In some example embodiments, an EPFN may include a bankcard or payment processor networks such as VISA™ and MASTERCARD™, EFT networks such as STAR™, PULSE™, or NYCE™, or even a file transfer networks such as the Automated Clearing House (ACH) network. The EPFN may also include a core bank process, or outsourced bank processing (e.g., as provided by Metavante Corporation, or Jack Henry Corporation). The token, in some example embodiments, is generated through the use of a hash algorithm, digital signature, or symmetric or asymmetric key algorithm. In some example embodiments, the token is generated through the use of time based rolling encryption. Additionally, the token may be a pseudo-number, alpha-numeric value, a 128-bit value, 256-bit value, a pointer to a location in physical or virtual memory, or some other suitable value. The token may be verified using a Public Key Infrastructure (PKI), or a Pretty Good Protection (PGP) web of trust.

Example System Architecture

Figure 1:
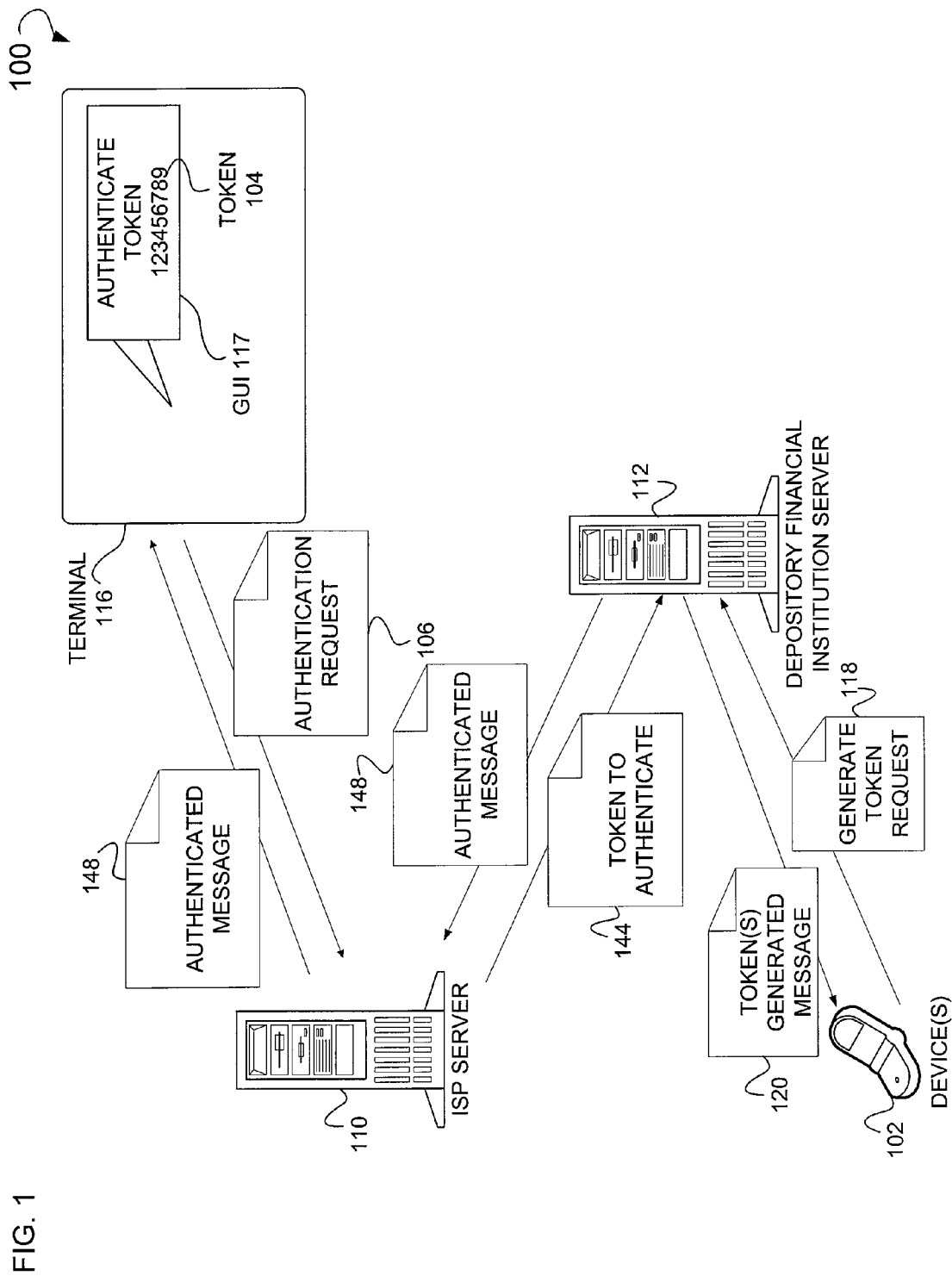
FIG. 1 is a diagram of a system, according to an example embodiment, illustrating token generation and authentication.

FIG. 1 is a diagram of an example system 100 illustrating token generation and authentication. Prior to making a request for authentication, an account holder registers once with some authenticating entity, such as a depository financial institution server 112, so that their identity can later be verified. This depository financial institution server 112 may be part of a PKI, or a PGP web of trust. The depository financial institution server 112 generates authentication tokens on behalf of the account holder. The depository financial institution server 112 may be controlled by a bank.

An account holder may use a device 102, perhaps taking the form of a cellular telephone in some embodiments, to inform the depository financial institution server 112 that authentication tokens have been requested. A token request 118 is generated and transmitted to the depository financial institution server 112. In one example embodiment, upon the entry of selected information (e.g., logging into a bank account controlled by the account holder with a username and password), the depository financial institution server 112 generates and issues one or more tokens to the account holder. Such tokens may take the form of a numeric value, one or more smart cards, a magnetic card, a Radio Frequency Identification (RFID) device, a bar code, or a printed piece of paper. Tokens may be physically generated, or electronically generated, perhaps in the form of an email message 120 to the device 102.

Once the tokens have been generated, they may be presented at a number of locations for authentication. In this manner, the account holder need only register one time with an authenticating entity, and thereafter, authentication may be accomplished using tokens, so that little or no information is passed on to various other entities (e.g., an unknown vendor) for inspection prior to various transactions taking place. An example of an authenticating entity is a merchant or merchant aggregator and server controlled by the merchant or merchant aggregator.

Here it can be seen that a system 100 for token generation and authentication may receive a token 104, and an authentication request 106 to authenticate the token 104. This authentication request 106 may be received at an Internet Service Provider (ISP) server 110 representing a vendor or other party requesting authentication of the token 104. In some example embodiments, the ISP server 110 may be controlled by a merchant or merchant aggregator. An example of a merchant aggregator is PAYPAL™. The request for authentication of the token 104 may be entered using a client terminal 116 with a GUI 117. The device 102 is an example of a client terminal 116. One example of such a request might be initiated by scanning a smart card having an embedded RFID device with the token recorded thereon. Another might be scanning a bar code, either as presented by a account holder on a printed piece of paper, or perhaps, as displayed on a cellular telephone. A further example of such a request may be the providing of a numeric value via an internet connection by the account holder.

Responsive to receiving the request, the ISP server 110 may forward the token 104 as part of a message 144 to the depository financial institution server 112. The depository financial institution server 112 may represent the financial entity or other entity that has registered the identity of the account holder seeking authentication by the vendor (e.g., represented by the ISP server 110). If the token is matched by the depository financial institution server 112, then a message 148 announcing that authentication was successful may be returned to the ISP server 110 from the depository financial institution server 112, and thereafter, to the client terminal 116.

Figure 2:
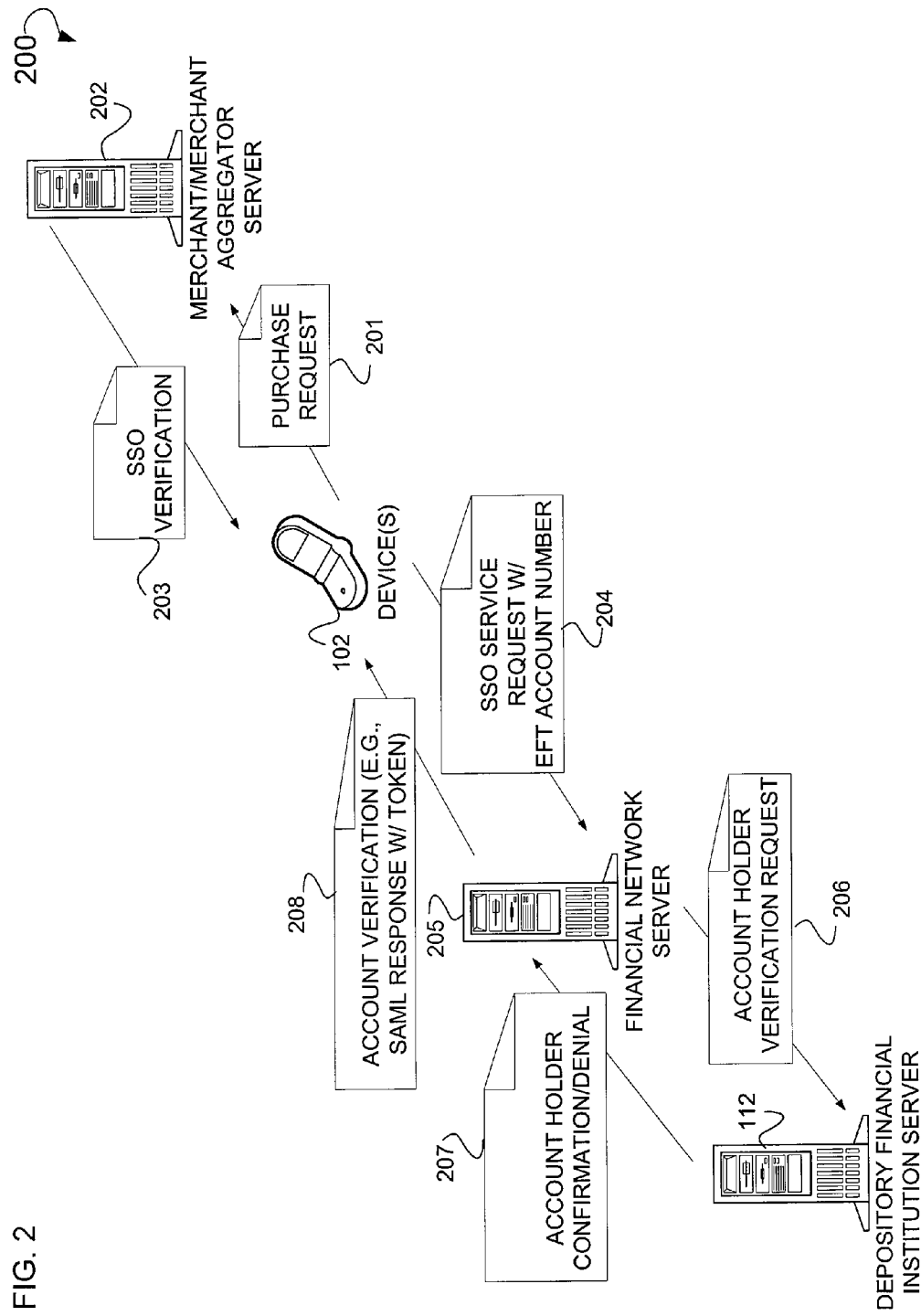
FIG. 2 is a diagram of a system, according to an example embodiment, used to complete an Electronic Funds Transfer (EFT) based transaction utilizing a depository financial institution server to verify the identity of a purchaser.

FIG. 2 is a diagram of an example system 200 used to complete an EFT based transaction utilizing a depository financial institution server to verify the identity of a purchaser. Shown is a device 102 in the form of a cell phone. This device 102 generates and transmits a purchase request 201 that is received by a merchant/merchant aggregator server 202. The merchant/merchant aggregator server 202 may be controlled by a merchant aggregator such as PAYPAL™. This purchase request 201 may be in the form of a request for a particular target resource that may reside upon or be accessible from the merchant/merchant aggregator server 202. A target resource may include a good or service that can be purchased. A Single Sign On (SSO) verification 203 is transmitted by the merchant/merchant aggregator server 202 across a network to be received by the device 102. The device 102 may utilize this SSO verification 203 to generate a SSO service request 204. This SSO service request 204 includes an EFT account number associated with the user of the device 102. The SSO service request 204 is received by a financial network server 205. The financial network server 205 may be controlled by STAR™. The financial network server 205 transmits an account holder verification request 206. This account holder verification request 206 is received by the depository financial institution server 112. The account holder verification request 206 includes a key value. A key value may be a numeric value, hash value, digital signature, symmetric or asymmetric key value. This key value is compared to an existing key value on file with the depository financial institution server 112. Where the key value corresponds to an account holder, conformation/denial 207 is generated confirming the identity of the party tendering a purchase request to the financial network server 205. The depository financial institution server 112 generates an account holder confirmation/denial 207. This account holder confirmation/denial 207 is received by the financial network server 205. An account verification 208 is generated by financial network server 205. This account verification may include a Security Assertion Markup Language (SAML) response. This account verification 208 is received by the device 102. Upon receiving the account verification 208, the device 102 may be utilized to complete or otherwise consummate the purchase of the good or service identified in the purchase request 201. In some example embodiments, based upon the receipt of the account verification 208, further purchases of good or services may be completed using the device 102.

Figure 3:
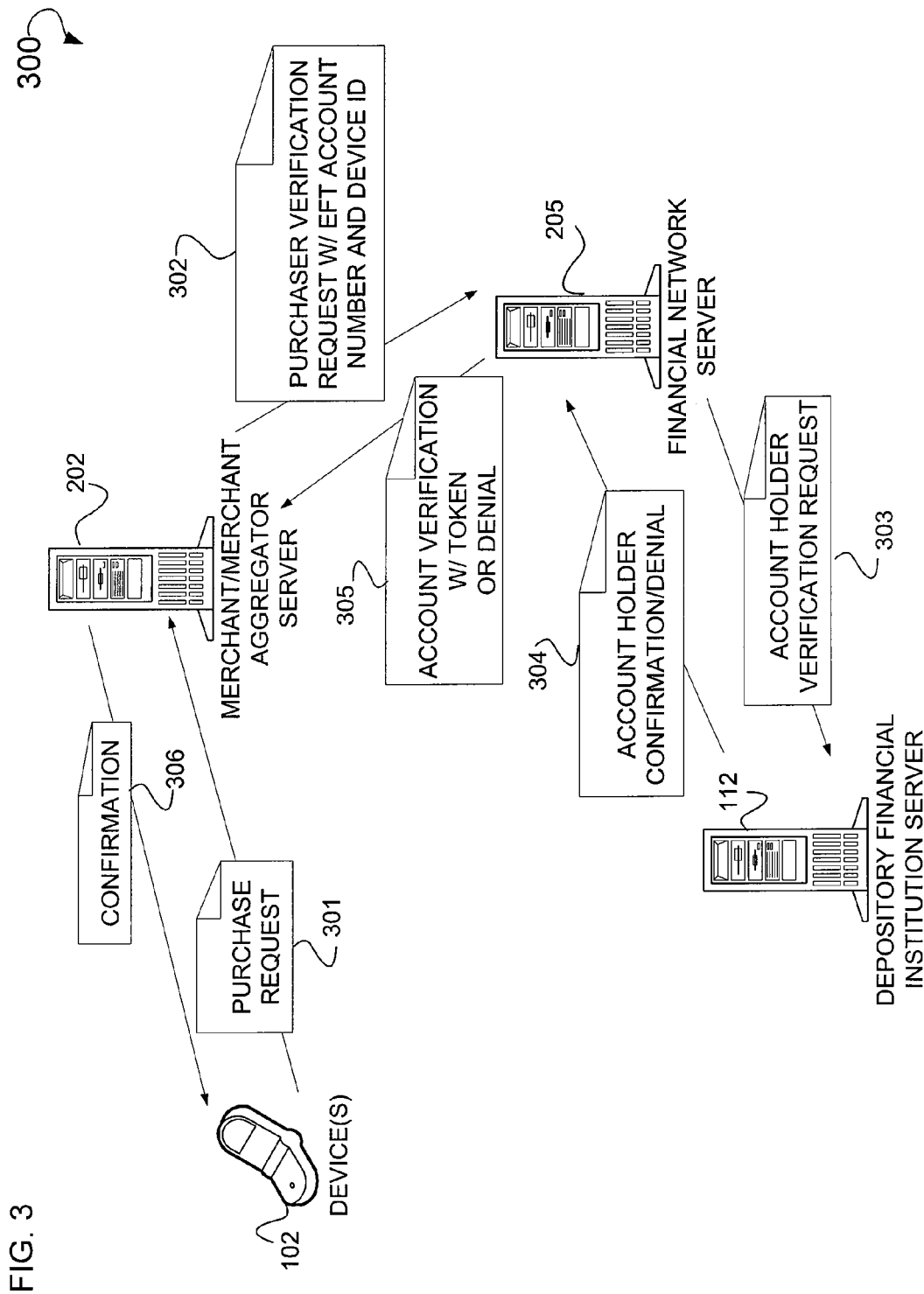
FIG. 3 is a diagram of a system, according to an example embodiment, utilizing a back-channel communication between a merchant/merchant aggregator server and an financial network server to verify the identity of a participant in a transaction utilizing EFT.

FIG. 3 is a diagram of an example system 300 utilizing a back-channel communication between the merchant/merchant aggregator server 202 and the financial network server 205 to verify the identity of a purchaser in a transaction utilizing EFT. Shown is the device 102 that generates a purchase request 301. This purchase request 301 is received by the merchant/merchant aggregator server 202. The merchant/merchant aggregator server 202 generates a purchase verification request 302 and transmits this purchase verification request 302 to the financial network server 205. Associated with this purchase verification request 302 may be an EFT account number and a device ID. The device ID may include a unique identifier for the device 102. A Media Access Control (MAC) address, an International Mobile Equipment Identity (IMEI) address or an Electronic Serial Numbers (ESNs) address are examples of device IDs. The financial network server 205 generates an account holder verification request 303 that is received by the depository financial institution server 112. The depository financial institution server 112 generates a confirmation, where the device ID corresponds to the device ID on file for the financial network account holder seeking to engage in an EFT transaction. The depository financial institution server 112 generates an account holder confirmation/denial 304 that is received by the financial network server 205. Based upon whether an account holder confirmation or denial is included in the account holder confirmation/denial 304, an account verification 305 is provided to the merchant/merchant aggregator server 202. This account verification 305 may include a token or may include a denial of the purchase request 301. The merchant/merchant aggregator server 202 generates a confirmation 306 and provides this to the device 102 confirming the purchase requested in the purchase request 301.

Figure 4:
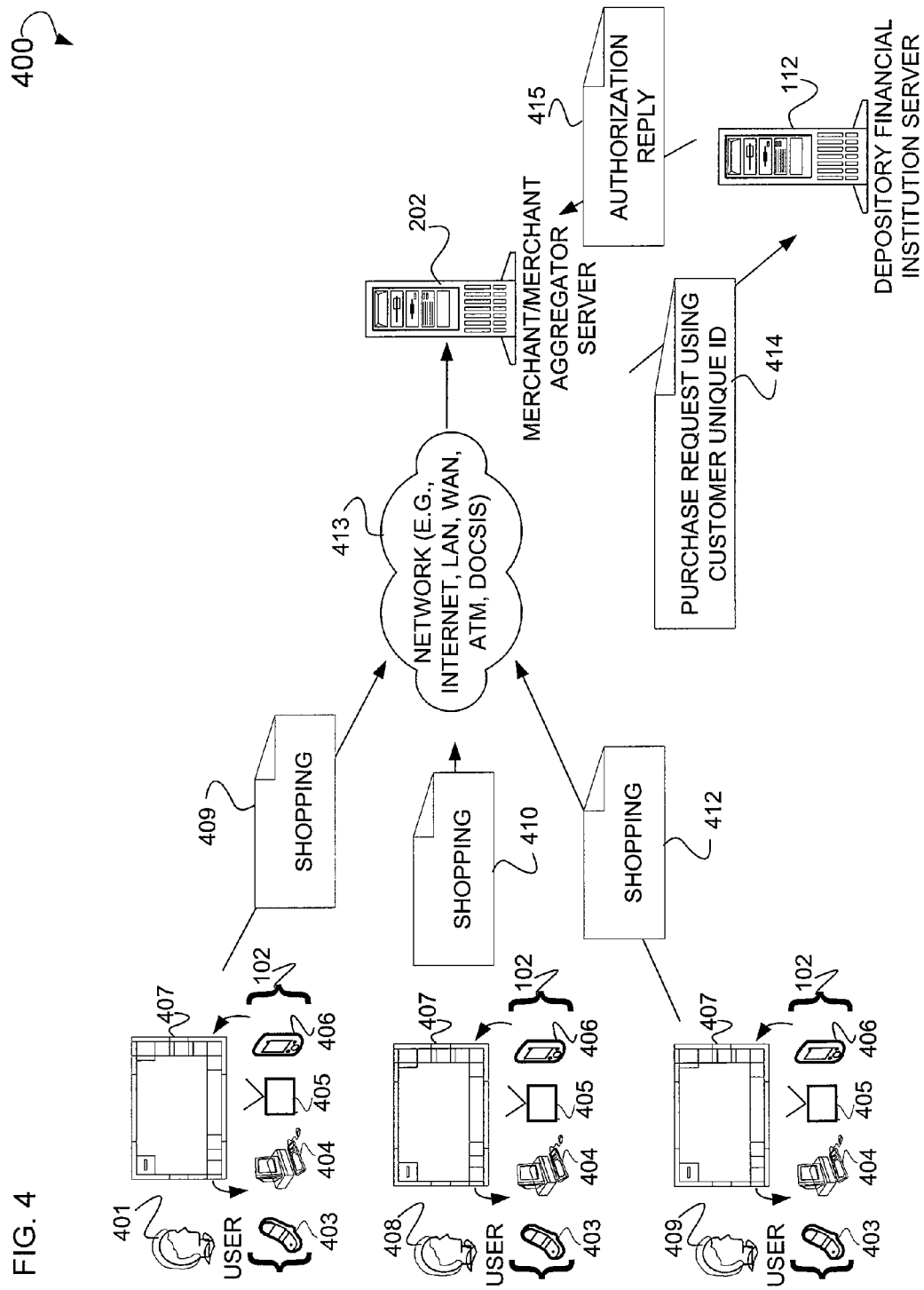
FIG. 4 is a diagram of a system, according to an example embodiment, wherein a bi-directional relationship between a depository financial institution server and a merchant/merchant aggregator server is used to complete an account holder purchase.

FIG. 4 is a diagram of an example system 400 wherein a bi-directional relationship between a depository financial institution server and a merchant/merchant aggregator server is used to complete an account holder purchase. Shown is a GUI 401 who, using an GUI 407 associated with one or more devices 102, generates a shopping selection 409. The device 102 includes, for example, a cell phone 403, computer system 404, television 405, or a Personal Digital Assistant (PDA) 406. Similarly, the user 408 generates a shopping selection 410 using on the device 102, and the user 409 generates a shopping selection 412 using the device 102. Users 401, 408, and 409 may be account holders. The shopping selections 409, 410 and 412 are transmitted across the network 413 and received by the merchant/merchant aggregator server 202. These shopping selections 409, 410, and 412 include account holder information, or other information used to uniquely identify the account holder to the merchant/merchant aggregator server 202. The network 413 may use anyone of a number of protocols including an Internet Protocol (IP), an Asynchronous Transfer Mode (ATM) protocol, a Data Over Cable Service Interface Specification (DOCSIS) protocol, Secure Sockets Layer (SSL), Transport Layer Security (TLS), or some other suitable protocol. Further, the network 413 may have an architecture including a Virtual Private Network (VPN) architecture, a Local Area Network (LAN), or Wide Area Network (WAN) architecture and associated topology. Operatively connected to the merchant/merchant aggregator server 202 is the depository financial institution server 112. The depository financial institution server 112 receives a purchase request using customer unique ID 414. The purchase request using customer unique ID 414 includes data relating to the purchase as reflected in the shopping selections 409 410, and 412. This data may include price information, quantity information, or other suitable information. The purchase request using customer unique ID 414 is received from the merchant/merchant aggregator server 202 by the depository financial institution server 112. The purchase request using customer unique ID 414 may include a token that is compared by the depository financial institution server 112 against value tokens for the merchant/merchant aggregator server 202. Where sufficient funds exist for the purchase, an authorization reply 415 is generated to signify an authorization of the purchase. The authorization reply 415 is received by the merchant/merchant aggregator server 202. The authorization reply 415 may include a boolean value or flag. The authorization reply 415 is received by the merchant/merchant aggregator server 202. In some example embodiments, a further embodiment of this method is through the use of an EPFN that is connected to one or more banks.

Figure 5:
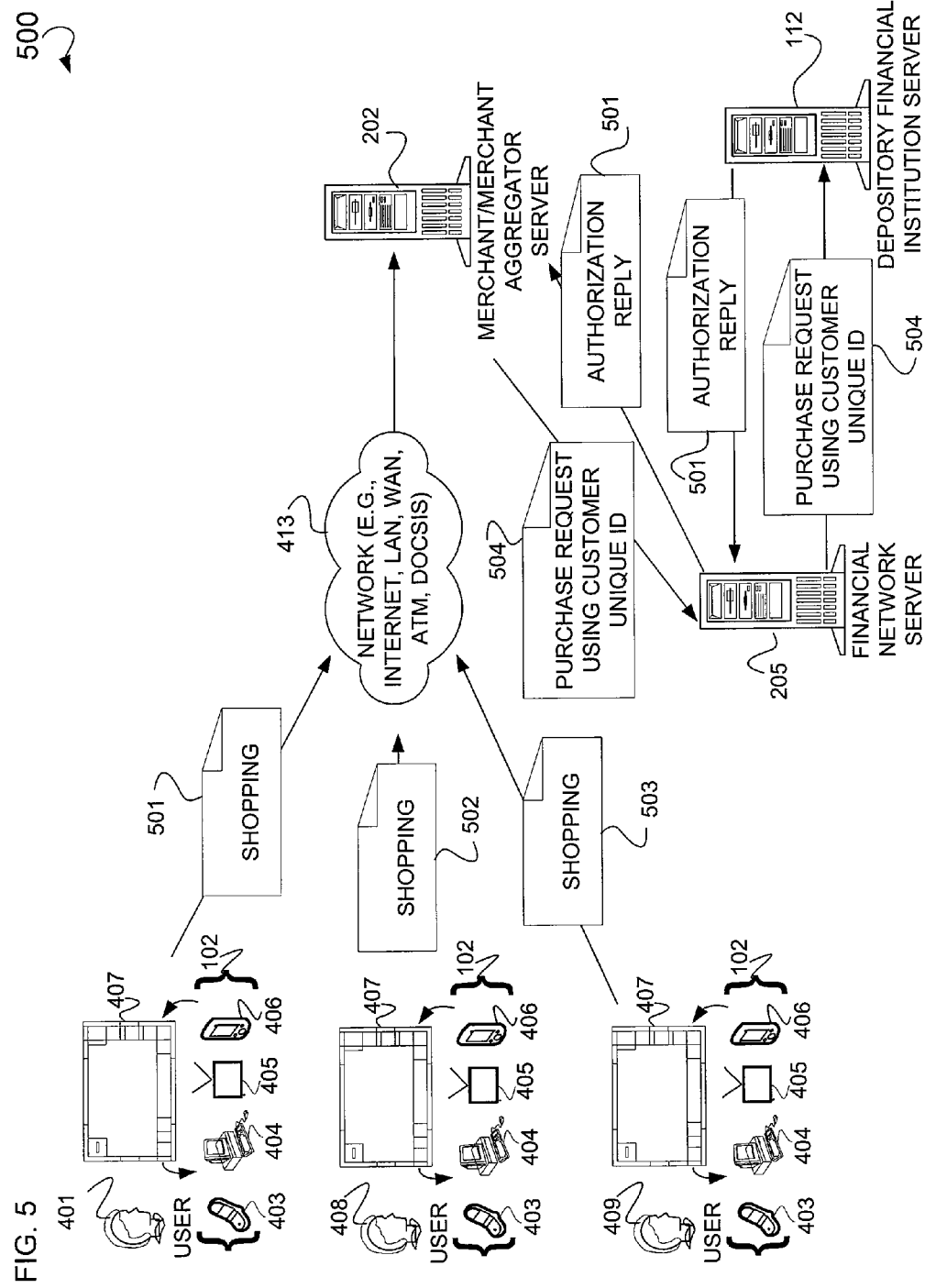
FIG. 5 is a diagram of a system, according to an example embodiment, wherein a purchase is made by an account holder that involves the use of a financial network server.

FIG. 5 is a diagram of an example system 500 wherein a purchase is made by an account holder that involves the use of a financial network server. In some example embodiments, the purchase request using customer ID 504 is generated based upon the shopping selections 501, 502, and 503. These shopping selections 501 through 503 include account holder information, or other information used to uniquely identify the account holder to the merchant/merchant aggregator server 202. The purchase request using customer ID 504 is received by the financial network server 205, and forwarded to the depository financial institution server 112. In some example embodiments, the financial network server 205 may track which depository financial institution server 112 issued token and which merchant/merchant aggregator server 202 received the token. A mapping may exist on the financial network server 205 between a particular token and the merchant/merchant aggregator server 202. This tracking is performed so as to validate that the merchant/merchant aggregator server 202 is entitled to use the token. The purchase request using customer unique ID 504 may include a token that is compared by the depository financial institution server 112 against tokens associated with the merchant/merchant aggregator server 202. An authorization reply 501 is generated by the depository financial institution server 112 and transmitted to the financial network server 205. Further, the authorization reply 501 is transmitted to the merchant/merchant aggregator server 202.

In some example embodiments, upon receipt of the purchase authorization request (e.g., the purchase request using customer ID 504), the financial network server 205 may ensure that the token is valid. Further, the financial network server 205 may ensure that the token comes from the merchant/merchant aggregator server 202 to whom the token was assigned. Validity may be determined based upon certain predefined parameters such as the size of the token, the confirmation of a symmetric or asymmetric key value, a digital signature, hash digest value, numeric range reflected in the token, or other suitable criteria. In some example embodiments, if the token is invalid or if it comes from any other merchant that is not the merchant to whom the token was sent, the network may decline the purchase authorization request. If the token is valid, the network may forward the purchase authorization request to the bank that, in turn, may perform additional checks to ensure the transaction can be approved.

Figure 6:
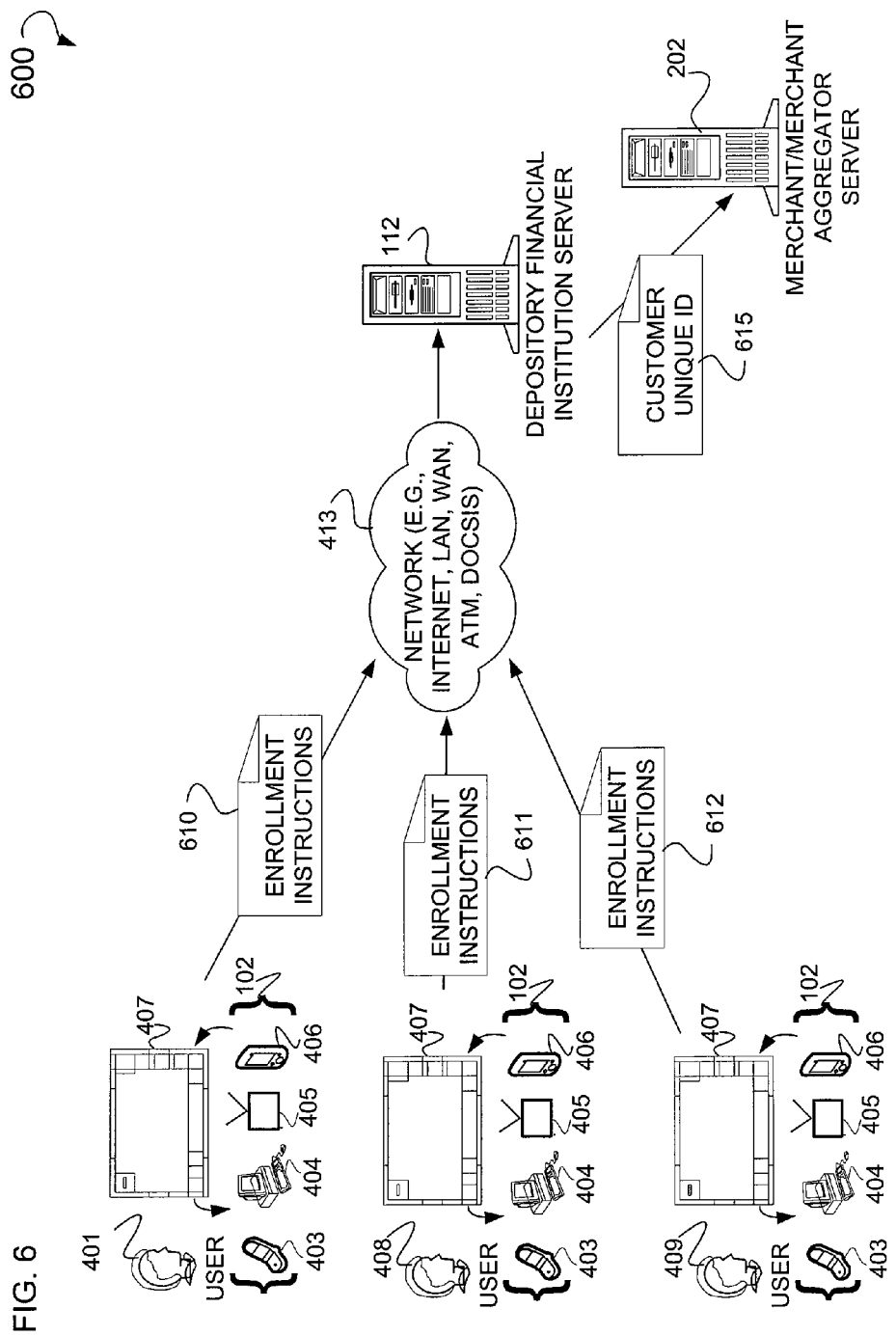
FIG. 6 is a diagram of a system, according to an example embodiment, illustrating an enrollment process for an account holder in a bi-directional relationship between a depository financial institution server and a merchant/merchant aggregator server.

FIG. 6 is a diagram of an example system 600 illustrating an enrollment process for an account holder in a bi-directional relationship between a depository financial institution server 112 and a merchant/merchant aggregator server 202. In some example embodiments, enrollment instructions 610, 611, and 612 are generated by the user (e.g., account holders) 401, 408, and 409 and the device 102 utilized by these users. These enrollment instructions 610, 611, and 612 may include uniquely identifying account holder information. This uniquely identifying account holder information includes, for example, social security number information, physical address information, and answers to challenge questions, a unique numeric value known to the account holder. Additionally, illustrated is the depository financial institution server 112 operatively connected to the merchant/merchant aggregator server 202. In some example embodiments, the depository financial institution server 112 generates a customer unique ID 615. This customer unique ID 615 is a token.

In some example embodiments, account holders initiate enrollment in response to an offer or solicitation to link their bank account, or any other financial account, to a merchant or merchant aggregator account. The linked account referenced herein is a funding account. The customer unique ID 615 may be mapped to a particular customer name, where the customer is an account holder of the depository financial institution that controls the depository financial institution server 112. Upon receiving these enrollment instructions 610 through 612, the depository financial institution server 112 generates a token (e.g., the customer unique ID 615) that the banks can later translate into funding account numbers (e.g., a number representing a financial account). The funding account for the account holder can be a deposit account, credit lines, or other suitable account. Account holders and financial institutions have control over which accounts are to be used to fund purchases. The token generated is sent to merchants using a secure channel (e.g., the network 413) along with other personal information that allows merchants, via the merchant/merchant aggregator server 202 or web server controlled by the merchant, to create an account associating the token with a particular account holder. In some example embodiments, the depository financial institution server 112 also stores the token along with specific information about the merchant that received the token.

In some example embodiments, during the purchase process account holders log on at the selected merchant web site and instruct the merchant to use the pre-stored tokens to pay for a specific purchase. Merchants send the purchase information to banks using a proprietary link passing the token as the pointer to the financial account to be used to fund the purchase. Upon receipt of the purchase authorization request banks may ensure that the token is valid and that it comes from the merchant to whom the token was assigned. If the token is invalid or if it comes from any other merchant that is not the merchant to whom the token was sent, the token originating bank may decline the purchase authorization request. If the token is valid and the request passes all other normal checks (e.g. enough money in the funding account), the bank may approve the purchase authorization request.

Figure 7:
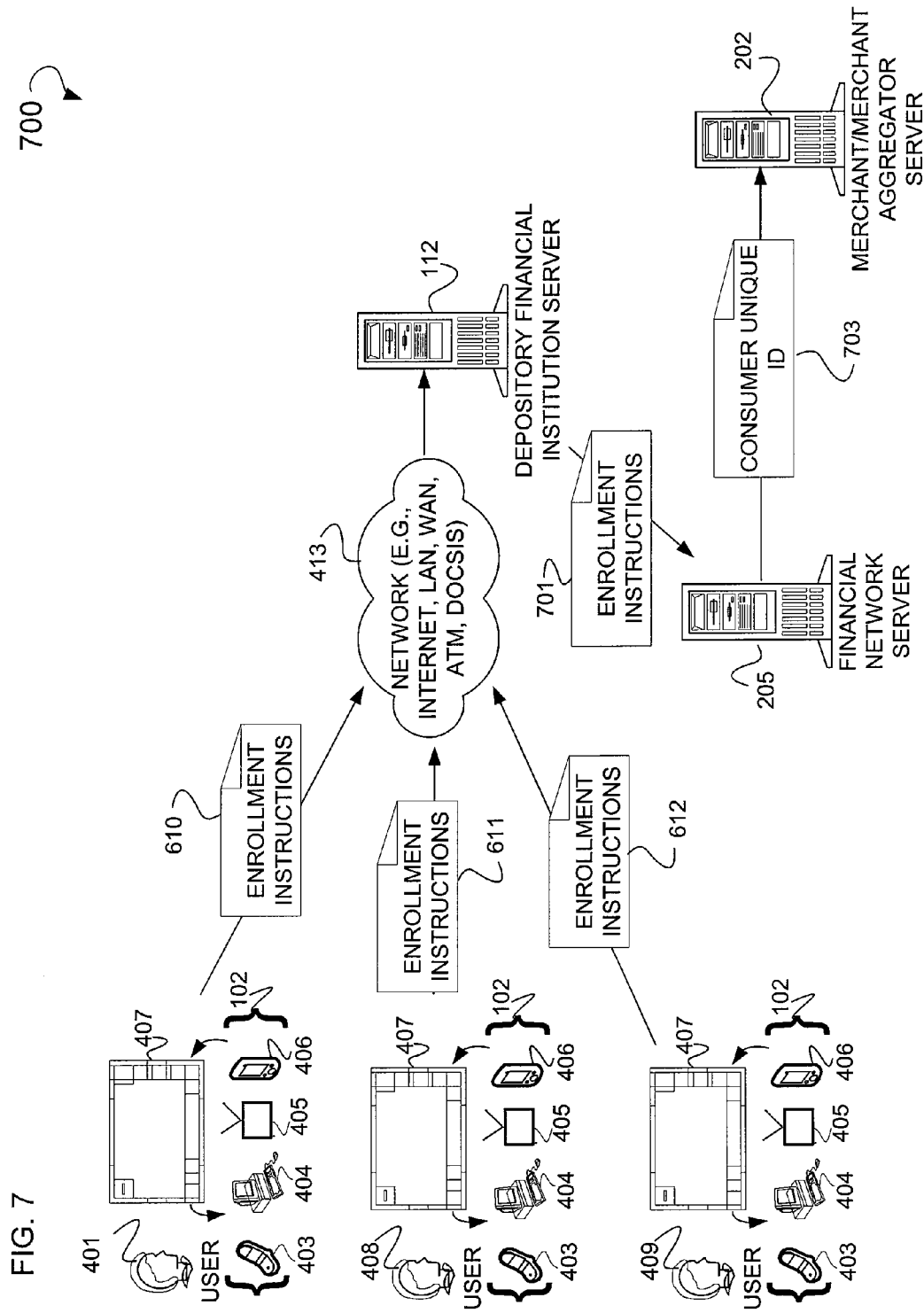
FIG. 7 is a diagram of a system, according to an example embodiment, that uses a Electronic Payment Financial Network (EPFN) to enroll a user and allow a user to participate in a transaction with a merchant/merchant aggregator server.

FIG. 7 is a diagram of an example system 700 that uses a EPFN to enroll an account holder user and allow the account holder to participate in a transaction with a merchant/merchant aggregator server 202. Shown are enrollment instructions 610, 611, and 612 that are transmitted to the depository financial server 112 across the network 413. Enrollment instructions 610 through 612 are provided to the depository financial institution server 112. These enrollment instructions 610 through 612 may be aggregated into the enrollment instructions 701 and provided to the financial network server 205. Enrollment instructions 701 may be a numeric value(s) tracked by the depository financial institution server 112, where each value corresponds to a particular account holder. A consumer unique ID 703 in the form of a token is provided to the merchant/merchant aggregator server 202. The depository financial institution server 112 tracks which merchant/merchant aggregator server 202 received the token. During the purchase process, account holders log on at the selected merchant web server, and instruct the merchant to use the pre-stored tokens to pay for a specific purchase. The merchant sends the purchase information across the network 413 to the depository financial institution server 112 to be used to verify the purchase.

Figure 8:
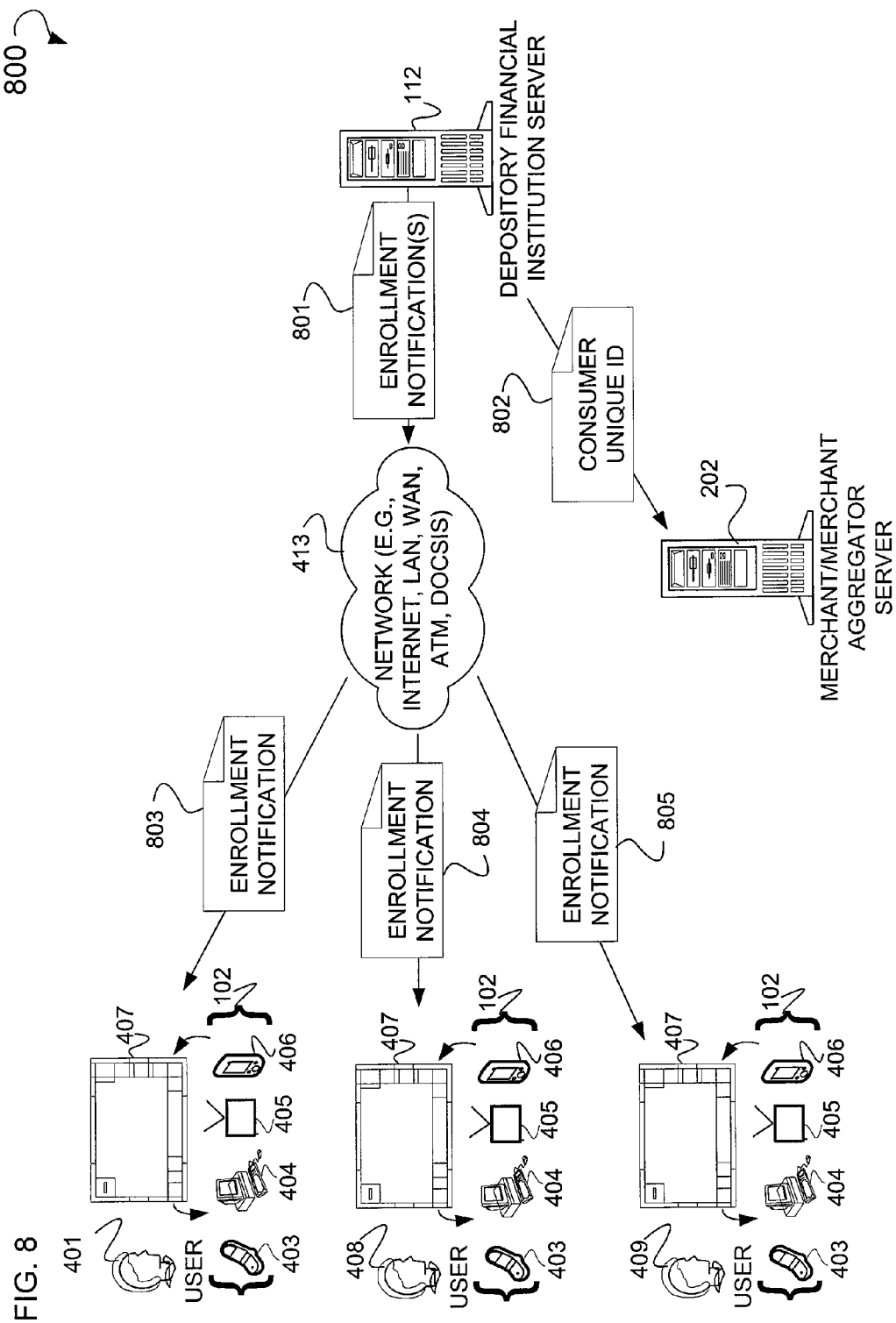
FIG. 8 is a diagram of an system, according to an example embodiment, to facilitate account holder enrollment.

FIG. 8 is a diagram of an example system 800 to facilitate account holder enrollment. Shown are enrollment notifications 801 that are generated by the depository financial institution server 112. Also shown is a consumer unique ID 802 (e.g., a token) that is also generated by the depository financial institution server 112. The enrollment instructions 801 are provided to the devices 102 operated by the users 401, 408, and 409. The enrollment instructions 801 are segregated into specific enrollment instructions 803, 804, and 805 for specific users (e.g., account holders). For example, enrollment notification 803 are provided to user 401, enrollment instructions 804 are provided to the user 408, and enrollment instructions 805 are provided to the user 409. These enrollment notifications 801, and 803 through 805 may be in the form of Uniform Resource Identifier (URI) formatted data that enables an account holder to enroll or otherwise utilize the system and method illustrated herein.

Figure 9:
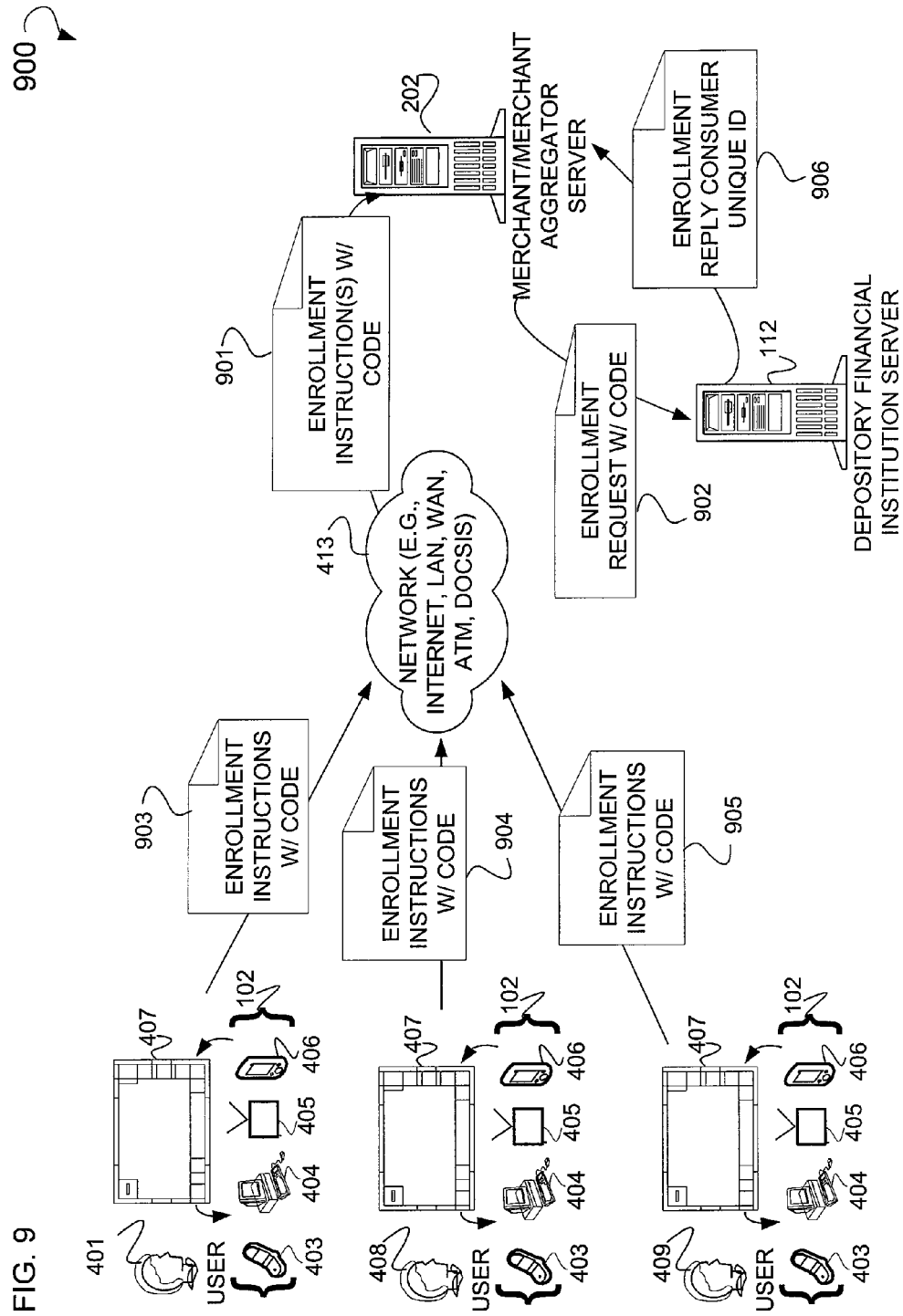
FIG. 9 is a diagram of a system, according to an example embodiment, illustrating the receipt of an enrollment instructions with code that is received by merchant/merchant aggregator server.

FIG. 9 is a diagram of an example system 900 illustrating the receipt of an enrollment instructions with code that is received by merchant/merchant aggregator server 202. In some example embodiments, enrollment instructions with code 903 through 905 is generated by each of the devices 102 controlled by the users 401, 408, and 409 respectively. These various enrollment instructions with code 903 through 905 are aggregated into the enrollment instructions with code 901. The enrollment instructions with code 901 is received by the merchant/merchant aggregator server 202. The merchant/merchant aggregator server 202 generates an enrollment request with code 902 that is transmitted to the depository financial institution server 112. The depository financial institution server 112 generates an enrollment reply consumer unique ID 906 (e.g., a token) that is transmitted to and received by the merchant/merchant aggregator server 202. An example of the enrollment instructions with code 901, and 903 through 905 is a messages that includes account holder information transmitted using Hypertext Transfer Protocol over Secure Socket Layer (HTTPS), the TLS protocol, or SSL protocol.

Figure 10:
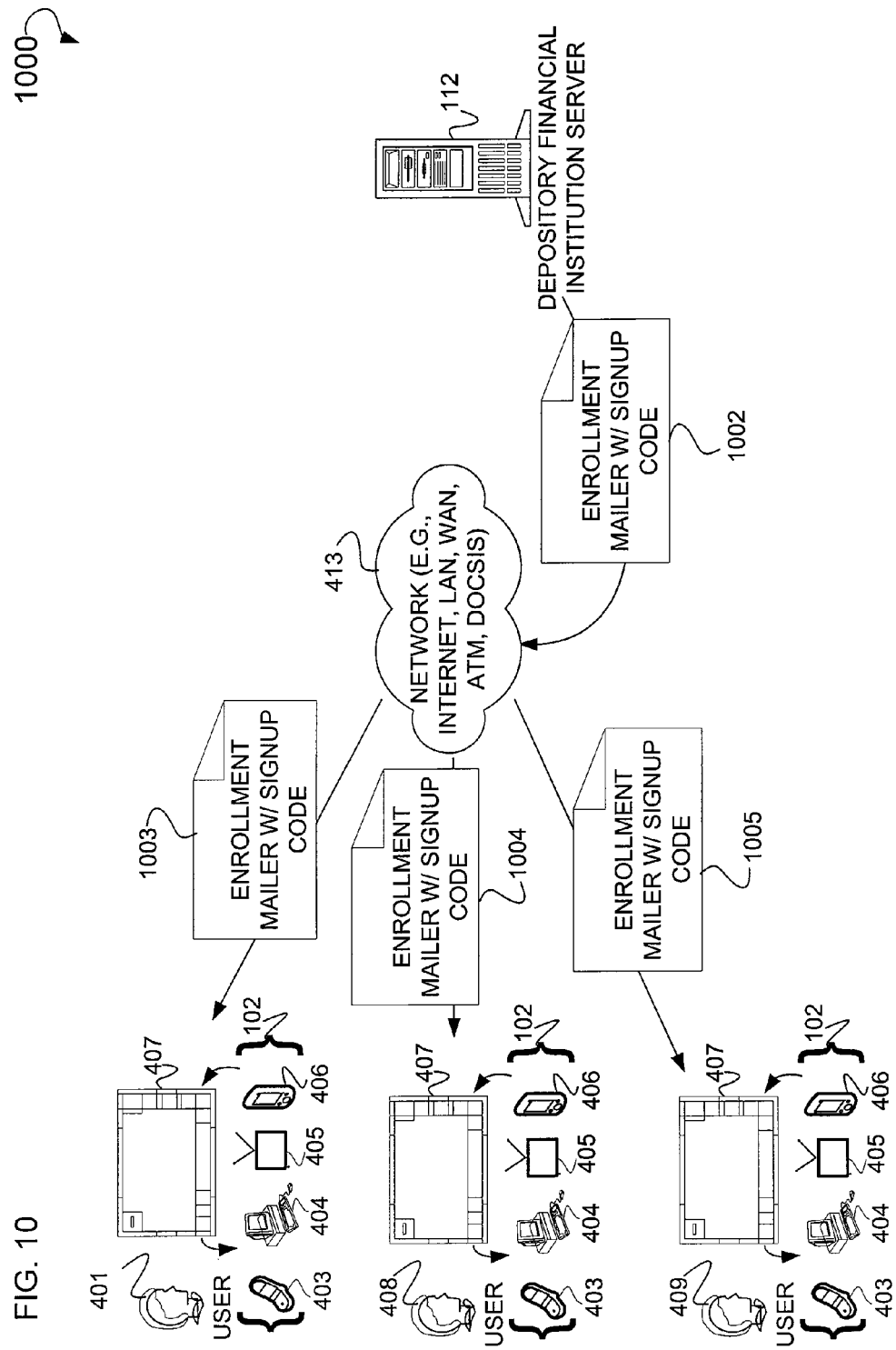
FIG. 10 is a diagram of a system, according to an example embodiment, that uses an enrollment mailer to solicit account holders to utilize or enroll in the system and method illustrated herein.

FIG. 10 is a diagram of an example system 1000 that uses an enrollment mailer to solicit account holders to utilize or enroll in the system and method illustrated herein. In some example embodiments, the depository financial institution server 112 generates an enrollment mailer with a sign up code 1002. This mailer may be an email received from a server controlled by their financial institutions asking them to enroll in the service. The mailer may include some form of unique code assigned to each account holder. The enrollment mailer with a sign up code 1002 may be transmitted across the network 413 as a enrollment mailer with a sign up code 1003 through 1005. Each of these enrollment mailer with a sign up code 1003 through 1005 may be received by the devices 102 controlled by the users 401, 408, and 409. These enrollment mailer with a sign up code 1002, and 1003 through 1005 may be in the form of URI formatted data that enables an account holder to enroll or otherwise utilize the system and method illustrated herein.

In some example embodiments, when account holders log on at a participating merchant web site, they provide their e-mail, the sign up code, and some other form of information known to them and their financial institution with which they have an account (e.g., the last four digits of their bank account number). The merchant/merchant aggregator server 202 may forward the information to the depository financial institution server 112 that may validate the information provided against its own records and reply to the merchant with the unique token for further commercial transactions as shown in FIG. 1 above.

Example Interfaces

Figure 11:
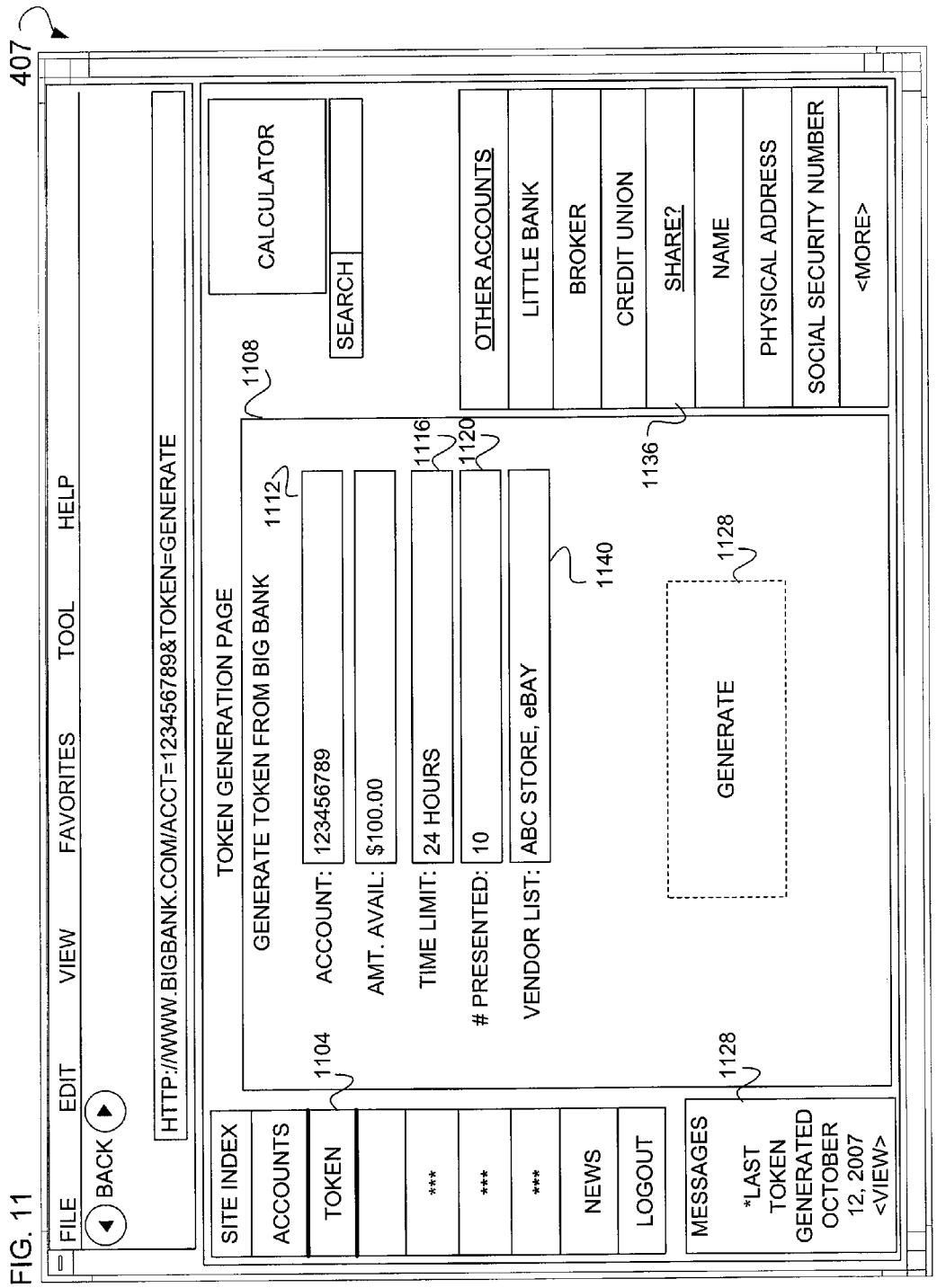
FIG. 11 is a simplified diagram illustrating an Graphical User Interface (GUI), according to an example embodiment.

FIG. 11 is a simplified diagram illustrating an example GUI 407 according to various embodiments of the system and method. This GUI 407 is one of many that are possible. In the particular example of FIG. 11, a sample web page that might be seen by an account holder that has logged into his bank account on the Internet is shown. Here, the "TOKEN" option 1104 has been selected, calling up the TOKEN GENERATION PAGE 1108. This selection permits the account holder account owner to select a particular account 1112 that can be used to generate tokens. Here it can be seen that several fields, such as a time limit field 1116, a number presented field 1120, and a vendor list field 1140 may be populated with various information.

For example, after an account holder selects an account 1112 to be used in conjunction with token generation, perhaps from a number of accounts in an account field, a time limit for token validity may be set in field 1116 (e.g., 24 hours after generation, the token will no longer be valid for authentication purposes). The account holder may also select how many times the token may be presented (e.g., 10) using the field 1120. Finally, a limited selection of entities that can request authentication may also be selected. In this way, the useful lifetime and other breadth of use characteristics for particular tokens may be limited, providing increased security. The account holder may also specify information to be shared with requesting parties by the authenticating entity upon successful authentication, perhaps using the sharing field 1136.

Once the limiting selections have been made, the account holder account owner might simply click on a generate widget button (not pictured) to generate a token. In some embodiments, a message field 1128 in the GUI 407 may be used to inform the individual account holder when the last token was generated. Other fields in the GUI 407 may be used to provide additional selection alternatives.

Figure 12:
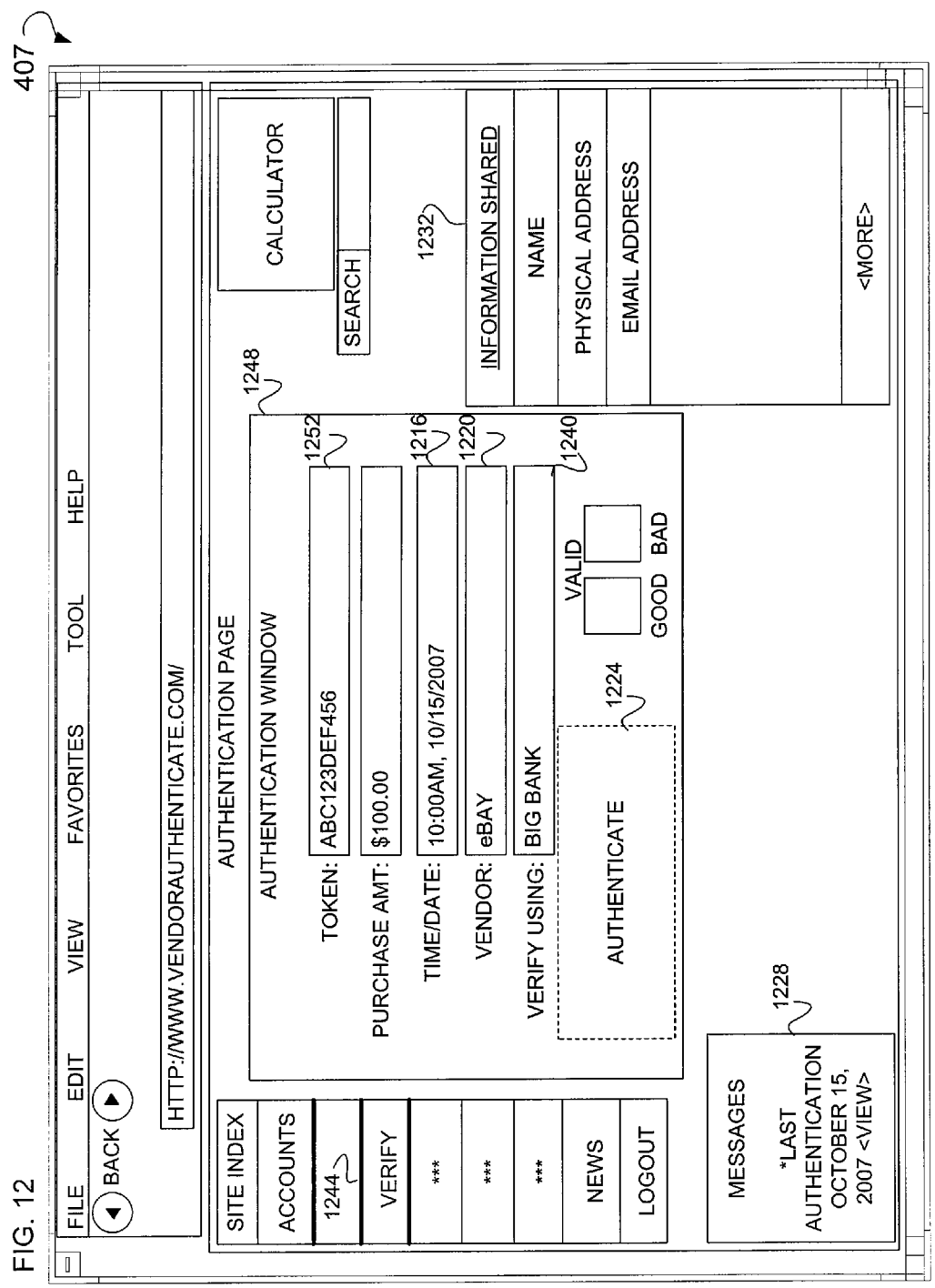
FIG. 12 is a block diagram illustrating another GUI, according to an example embodiments.

FIG. 12 is a block diagram illustrating another example of a GUI 407 according to various embodiments of the system and method. This GUI 407 is one of many that are possible. In the particular example of FIG. 12, a sample web page that might be seen by a vendor that has logged into an authentication entity web page on the Internet is shown. Here, the "VERIFY" option 1244 has been selected, calling up the AUTHENTICATION PAGE 1248. This selection permits the vendor (e.g., the requesting party) to enter a token into an authentication system by a number of methods, including manually typing in a coded value into the token field 1252. Other methods of entry include electrical (e.g., direct contact pads), electronic (e.g., RFID), and optical (e.g., bar code) scanning.

The time and date may be entered into the time/date field 1216, and the party making the request may identify themselves in the vendor field 1220. The authentication entity may be selected using the verification field 1240. For security purposes, any of the fields 1252, 1216, 1220, and 1240 may be auto-generated by the authenticating entity (e.g., the depository financial institution server 112).

To authenticate the token, the requesting party might simply click on an authentication widget (not pictured). The validity of the token (and therefore authentication of the identity of the account holder, such as a customer of the vendor) may be indicated by simple GO, NO-GO or GOOD/BAD indicators. Upon successful authentication, certain information 1232 may be shared with the requesting party. Here, for example, the name, physical address, and the email address of the account holder are shared. Other information, obtained at the time of registration or thereafter by the authenticating entity, may also be shared, if requested by the requesting party and permitted by the account holder. Such information may be specified as part of the token generation activity (shown in FIG. 2). In some embodiments, a message field 1228 in the GUI 407 may be used to inform the requesting party when the last authentication occurred, either with respect to the particular token being authenticated, or perhaps with respect to the vendor requesting authentication.

In some example embodiments, a machine implemented method is used to generate tokens through TRBE. In this scenario both depository financial institutions and merchants exchange a secret hash function, or encryption algorithm. For example, this could be a bilateral algorithm shared between one bank and one merchant, a multi-lateral algorithm shared between one bank and multiple merchants, or a network based algorithm that is applicable to all participating banks and all participating merchants. When the account holder enrolls, banks pass along—instead of the token—a seed value that is unique by account holder. When the account holder indicates he/she wants to purchase something from a participating merchant, the merchant retrieves the seed value associated with the account holder and it feeds it to the algorithm creating a token which is then sent to the depository financial institution for authorization. This algorithm could also be time based, wherein the seed is a numeric value generated by a clock.

Example Devices and Logic

Figure 13:
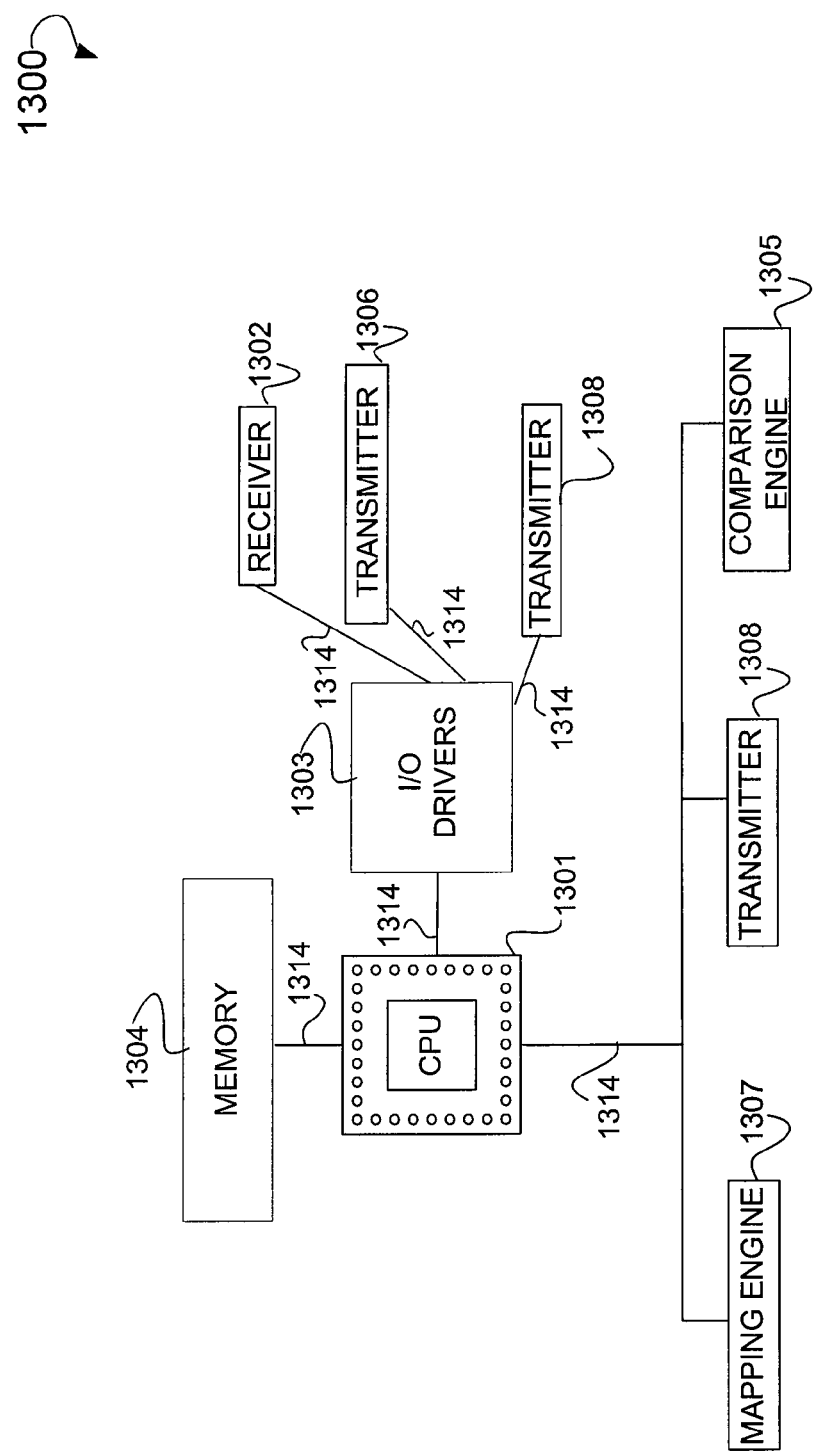
FIG. 13 is a block diagram of the various hardware and software components, according to example embodiments, used in a computer system that determines the validity of a token.

FIG. 13 is a block diagram of the various example hardware and software components used in a computer system that determines the validity of a token. This computer system may be the financial network server 205, or depository financial institution server 112. In some example embodiments, these various components can all be hardware, whereas in other embodiments these components can all be software, or a combination of the two. Some example embodiments may include a Central Processing Unit (CPU) 1301 being used to perform various mathematical operations. Included within the CPU 1301, for example, are various adders and multipliers, or only adders, or only multipliers. The CPU 1301 is operatively connected to memory 1304 and an Input/Output (I/O) driver 1303. In some example embodiments, a receiver 1302 is operatively connected to an I/O driver 1303 via buses 1314 to receive a purchase request through an EPFN, the purchase request including a token to identify a merchant server. A comparison engine 1305 is operatively connected to the CPU 1301 to compare the token against a merchant identifier value to determine that that token is assigned to the merchant server. In some example embodiments, a merchant identifier value is a numeric, or alpha-numeric value used to uniquely identify a merchant or merchant aggregator, and/or a server controlled by the merchant or merchant aggregator. A transmitter 1306 is operatively connected to the I/O driver 1303 to transmit a purchase request authorization to authorize an online transaction, where the token and merchant identifier values are equivalent. In some example embodiments, the purchase request includes at least one of account holder information, a purchase amount, or a seed value. In some example embodiments, a mapping engine 1307 is operatively connected to the CPU 1301 to map the token to the merchant identifier value. In some example embodiments, the token is generated from a time based seed value. A transmitter 1308 is operatively connected to the I/O driver 1303 to transmit an invalidity message where the token and merchant identifier values are not equivalent. In some example embodiments, online transaction includes a transaction in commerce that is conducted by two or more devices communicating over a network.

Figure 14:
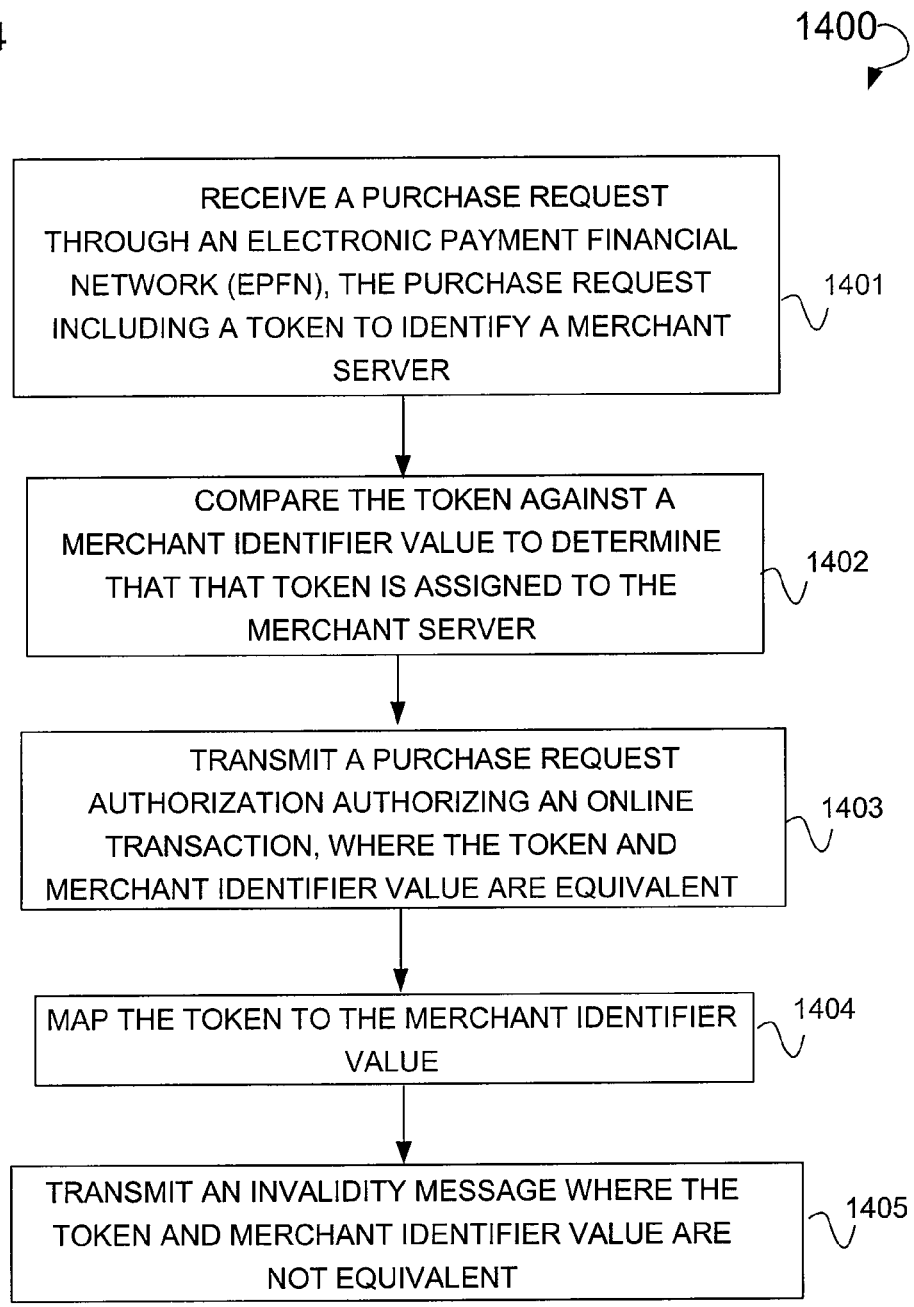
FIG. 14 is a flow chart illustrating a method, according to an example embodiment, implemented by a computer system used to determine the validity of a token.

FIG. 14 is a flow chart illustrating an example method 1400 implemented by a computer system used to determine the validity of a token. The computer system may be the financial network server 205, or depository financial institution server 112. An operation 1401 is executed by the receiver 1302 to receive a purchase request through an EPFN, the purchase request including a token to identify a merchant server. An operation 1402 is executed by the comparison engine 1305 to compare the token against a merchant identifier value to determine that that token is assigned to the merchant server. An operation 1403 is executed by the transmitter 1306 to transmit a purchase request authorization authorizing an online transaction, where the token and merchant identifier value are equivalent. In some example embodiments, the purchase request includes at least one of account holder information, a purchase amount, or a seed value. Operation 1404 is executed by the mapping engine 1307 to map the token to the merchant identifier value. In some example embodiments, the token is generated from a time based seed value. Operation 1405 is executed by the transmitter 1308 to transmit an invalidity message where the token and merchant identifier value are not equivalent. In some example embodiments, an online transaction includes a transaction in commerce that is conducted by two or more devices communicating over a network.

Figure 15:
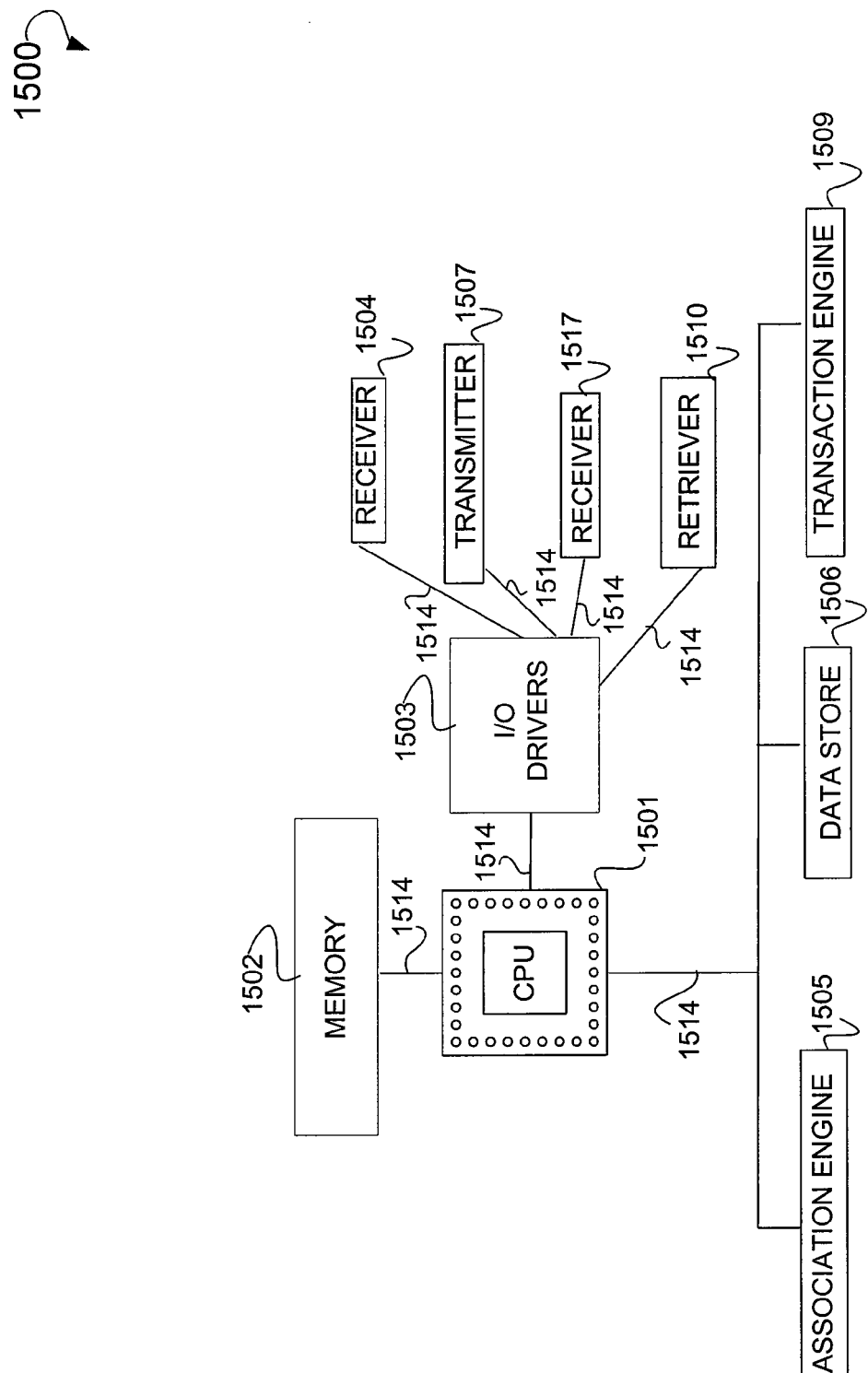
FIG. 15 is a block diagram of the various hardware and software components, according to example embodiments, used by a computer system to receive and store a token for use in an online transaction.

FIG. 15 is a block diagram of the various example hardware and software components that can be used by a computer system to receive and store a token for use in an online transaction. The merchant/merchant aggregator server 202 is an example of a computer server. In some embodiments, these various components can all be hardware, whereas in other embodiments these components can all be software, or, in some embodiments, these components can be a combination of the two. Some example embodiments may include a CPU 1501 being used to perform various mathematical operations. Included within the CPU 1501, for example, are various adders and multipliers, or only adders, or only multipliers. Operatively connected to the CPU 1501 via a bus 1514 is a memory 1502, and I/O driver 1503. In some example embodiments, a receiver 1504 is operatively coupled to the I/O driver 1503 to receive a token associated with an account holder of a depository financial institution, the token to authorize payment during an online transaction. An association engine 1505 is operatively coupled to the CPU 1501 via a bus 1514 to associate the token with the account holder to facilitate the online transaction. A data store 1506 is operatively coupled to the CPU 1501 to store the association between the token and the account holder. A further receiver 1517 is operatively coupled to the I/O driver 1503 via a bus 1514 to receive a shopping selection that includes information identifying the account holder. A retriever 1508 is operatively coupled to the CPU 1501 via a bus 1514 to retrieve the token based upon the information. A transmitter 1507 is operatively to the I/O driver 1503 via a bus 1514 to transmit the token as part of a purchase request. In some example embodiments, a depository financial institution includes a bank. A further receiver 1508 is operatively coupled to the I/O driver 1503 via a bus 1514 to receive a purchase request authorization. A transaction engine 1509 is operatively coupled to the CPU 1501 via a bus 1514 to complete the online transaction based upon the receipt of the a purchase request authorization.

Figure 16:
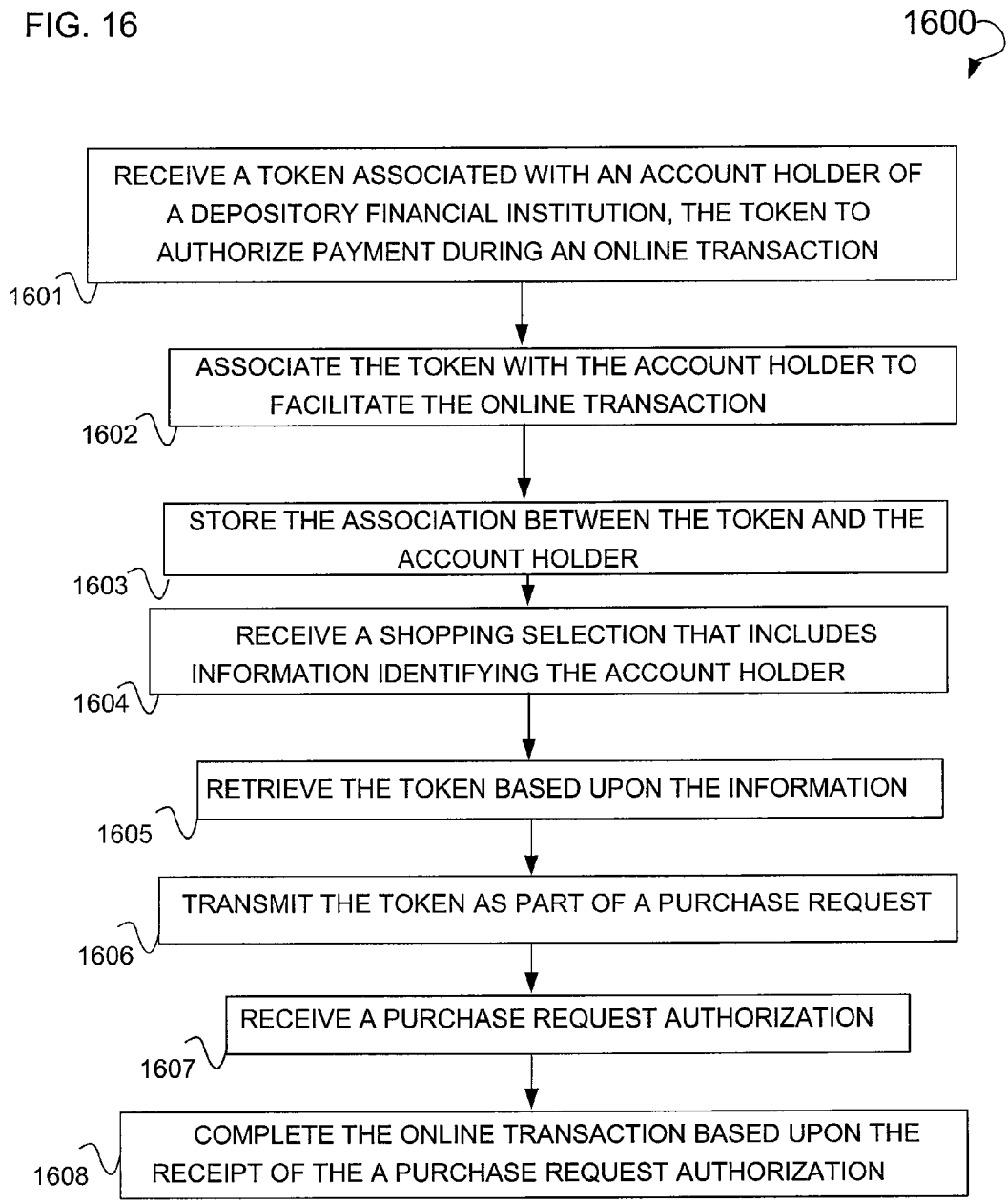
FIG. 16 is a flow chart illustrating a method, according to an example embodiment, implemented by a computer system to receive and store a token for use in an online transaction.

FIG. 16 is a flow chart illustrating an example method 1600 implemented by a computer system to receive and store a token for use in an online transaction. The method 1600 may be executed by the merchant/merchant aggregator server 202. Operation 1601 is executed by the receiver 1504 to receive a token associated with an account holder of a depository financial institution, the token to authorize payment during an online transaction. Operation 1602 is executed by the association engine 1505 to associate the token with the account holder to facilitate the online transaction. Operation 1603 is executed by the data store 1506 to store the association between the token and the account holder. Operation 1604 is executed by the receiver 1517 to receive a shopping selection that includes information identifying the account holder. Operation 1605 is executed by a retriever 1510 to retrieve the token based upon the information. Operation 1606 is executed by the transmitter 1507 to transmit the token as part of a purchase request. In some example embodiments, a depository financial institution includes a bank. Operation 1607 is executed by the receiver 1517 to receive a purchase request authorization. Operation 1608 is executed by the transaction engine 1509 to complete the online transaction based upon the receipt of the a purchase request authorization.

FIG. 17 is an example illustration of an example dual TRBE key fob 1700 used to generate a seed value that can be conversed to a token through the use of an algorithm. In some embodiments, a screen 1701 displays a $1^{st}$ TRBE seed value. In some embodiments, a second screen 1702 displays a $2^{nd}$ TRBE seed value. Some example embodiments may include a button 1703 allowing the value from screen 1701 to be displayed. In some embodiments, a button 1704 allows a second value in second screen 1702 to be displayed. Some embodiments may include the color coding of the buttons 1703 & 1704 to denote a first button and a second button. For example, button 1703 could be black, while button 1704 could be white. In some embodiments, a key ring 1705 allows the fob 1700 to be operatively coupled to a key chain or other convenient means of carrying the fob 1700. Some embodiments may include a Universal Serial Bus (USB) plug 1706. Further, displayed in FIG. 17 is a side view showing button 1703, key ring 1705, and USB plug 1706. Also described is a top-down view showing screens 1701, 1702, buttons 1703, 1704, key ring 1705, and USB plug 1706.

In some example embodiments, one or more of the seed values generated by the dual TRBE key fob 1700 are compared to one or more seed values generated by a clock residing on the depository financial institution server 112. Where these values are equivalent, a transaction may be consummated between the user of the TRBE key fob 1700 and the merchant/merchant aggregator server 202. In one example embodiment, the screen 1710 displays a first seed value at a first point in time, while the second screen 1702 displays a second seed value at a second point in time. The first or second seed values may be provided to the merchant/merchant aggregator server 202. The merchant/merchant aggregator server 202 uses oat least one of these seed values to an algorithm to generate a token this token is provided to the depository financial institution server 112. Where the token is verified, the depository financial institution server 112 transmits an authorization signal to the merchant/merchant aggregator server 202 signifying that the transaction between the user of the dual TRBE key fob 1700 and the merchant/merchant aggregator server 202 may be consummated.

In cases where the first and second seed values do not synchronize with the clock residing on the depository financial institution server 112, the clock residing on the dual TRBE key fob 1700 may be resynchronized with the clock on the depository financial institution server 112 through the use of the USB plug 1706. Specifically, using the USB plug 1706, the dual TRBE key fob 1700 may be plugged into the device 102. A session may be established between the devices 102 and the depository financial institution server 112, the purpose of which is to retrieve the current time from the clock residing on the depository financial institution server 112. This current time is uses to set the clock on the dual TRBE key fob 1700.

Figure 18:
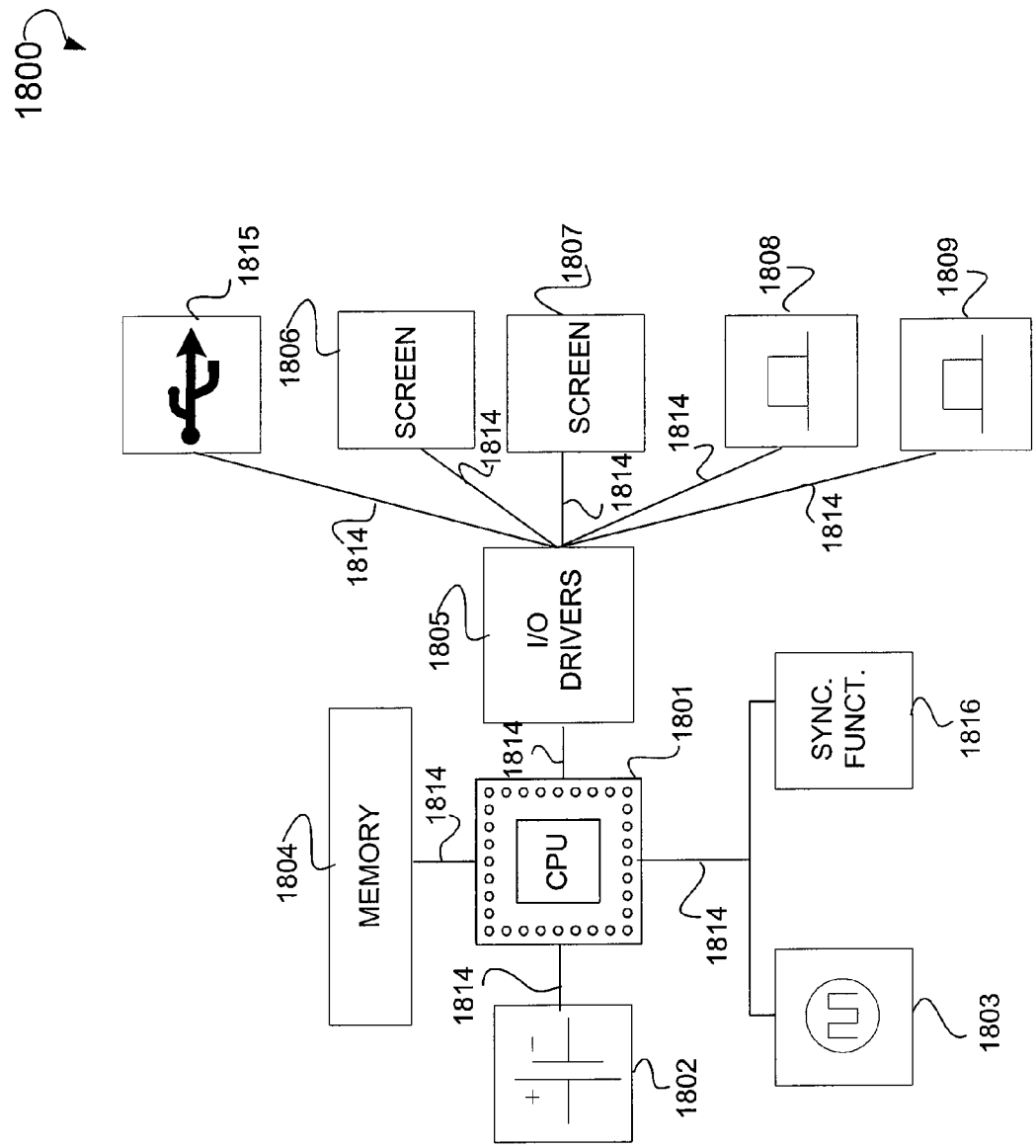
FIG. 18 is a block diagram of the various hardware and software components, according to example embodiments, that can be used to create a dual TRBE key fob.

FIG. 18 is a block diagram of the various example hardware and software components that can be used to create a dual TRBE key fob 1700. In some embodiments, these various components can all be hardware, whereas in other embodiments these components can all be software, or, in some embodiments, these components can be a combination of the two. Some example embodiments may include a CPU 1801 being used to perform various mathematical operations. Included within the CPU 1801, for example, are various adders and multipliers, or only adders, or only multipliers. In some example embodiments, the CPU 1801 is able to process a 20 bit, 21 bit or some other suitable size word. In some embodiments, the CPU 1801 is operatively coupled to a battery 1802. Some example embodiments may include a battery 1802 as a rechargeable battery, whereas in other embodiments it is a disposable battery. The CPU 1801 and battery 1802 are connected via a bus 1814. In some embodiments, the CPU 1801 is operatively coupled via a bus 1814 to a piece of memory 1804. In some example embodiments, the memory 1804 is used to store values derived from a clock 1803, whereas in other embodiments this memory is used to store TRBE values (e.g., seed values). These values can be one or more sequential clock values (e.g., integers) or serial clock values, or these values can be serial clock values or sequential clock values. This memory 1804 can also include, in some embodiments, various input/output drivers 1805 or a synchronization function 1816. This memory 1804 can be of some suitable size including, for example, a 64 kilobyte or megabyte memory, a 128 kilobyte or megabyte memory, or a 256 kilobyte or megabyte memory, or some other suitable memory size. In some embodiments, this memory size will be contingent upon whether additional memory is need to use the device to store data (e.g., data files, media files), in addition to, TRBE values.

Some example embodiments may include various input/output drivers 1805 that are operatively coupled via a bus 1814 to a CPU 1801. These input/output drivers 1805 are then operatively coupled to various input/output devices via various buses 1814. In some example embodiments, an optional USB plug 1815 is connected to the input/output drivers 1805. Some example embodiments may include the USB plug 1815 as a way to provide power to recharge the battery 1802. Additionally, through this USB plug 1815, in some embodiments, clock synchronization takes place between a clock 1803, and a clock located remotely as a part of, for example, the depository financial institution server 112. In some example embodiments, other types of data transfer and synchronization can take place via the USB plug 1815. Some example embodiments may include a first screen 1806 that is operatively coupled to the input/output drivers 1805. In some embodiments, a second screen 1807 is operatively coupled to the input/output drivers 1805 via a bus 1814. In some example embodiments, only one screen (e.g., 1806 or 1807), is operatively coupled to the input/output drivers 1805. Example embodiments may further include the screen 1806 and/or 1807 as having liquid crystal displays, whereas in other embodiments they are another type of suitable display including, but not limited to, a color screen, a monochrome screen or some other suitable screen. Some example embodiments may include a button 1808 (e.g., a biased switch) that is operatively coupled to the input/output drivers 1805, whereas in other embodiments a button 1809 (e.g., a biased switch) is operatively coupled to the input/output driver 1805 via a bus 1814. In some example embodiments, both buttons 1808 and 1809 can be used in the dual TRBE key fob 1700, whereas in other embodiments only one button (e.g., 1808 or 1809) is used in the device. In some embodiments, the clock 1803 can be replaced with an encryption function using, for example, symmetric encryption such as the Advanced Encryption Standard (AES) or Data Encryption Standard (DES). In some embodiments, the memory 1804 can be a flash memory.

Some embodiments may include a memory 1804 that may be Electrically Erasable Programmable Read-Only Memory (EEPROM), Random-Access Memory (RAM), Flash memory or some other suitable memory type. Some embodiments may include EEPROM where the dual TRBE key fob 1700 is completely powered down, whereas if the dual TRBE key fob 1700 is going to continue to use memory (e.g., to power the clock 1803), RAM may be preferable. Moreover, if the device is going to be used for things in addition to the generation and storage of tokens, then Flash memory may be preferable.

In some embodiments, the battery 1802 may be a Lithium-ion battery, Lithium-ion polymer battery, Nickel-cadmium battery, Nickel metal hydride battery, or some other suitable rechargeable battery. Further, in some embodiments, the battery 1802 may be an alkaline battery, Lithium battery, Silver-oxide battery, or some other suitable battery type.

In some example embodiments, the clock 1803 may be an application written in software and saved into the memory 1804, whereas in other embodiments it may be completely implemented using hardware. In some embodiments, the values generated by the clock 1803 are integer values. Where the clock 1803 is implemented in hardware, an additional software or hardware module may be needed to allow for the resynchronization of the clock with another clock contained on, for example, the depository financial institution server 112. In some embodiments, resynchronization will take the form of the software module, compensating for the difference between the clock signal and the clock value as reflected in the depository financial institution server 112. In providing this compensation, the problem of token drift can be addressed.

Figure 19:
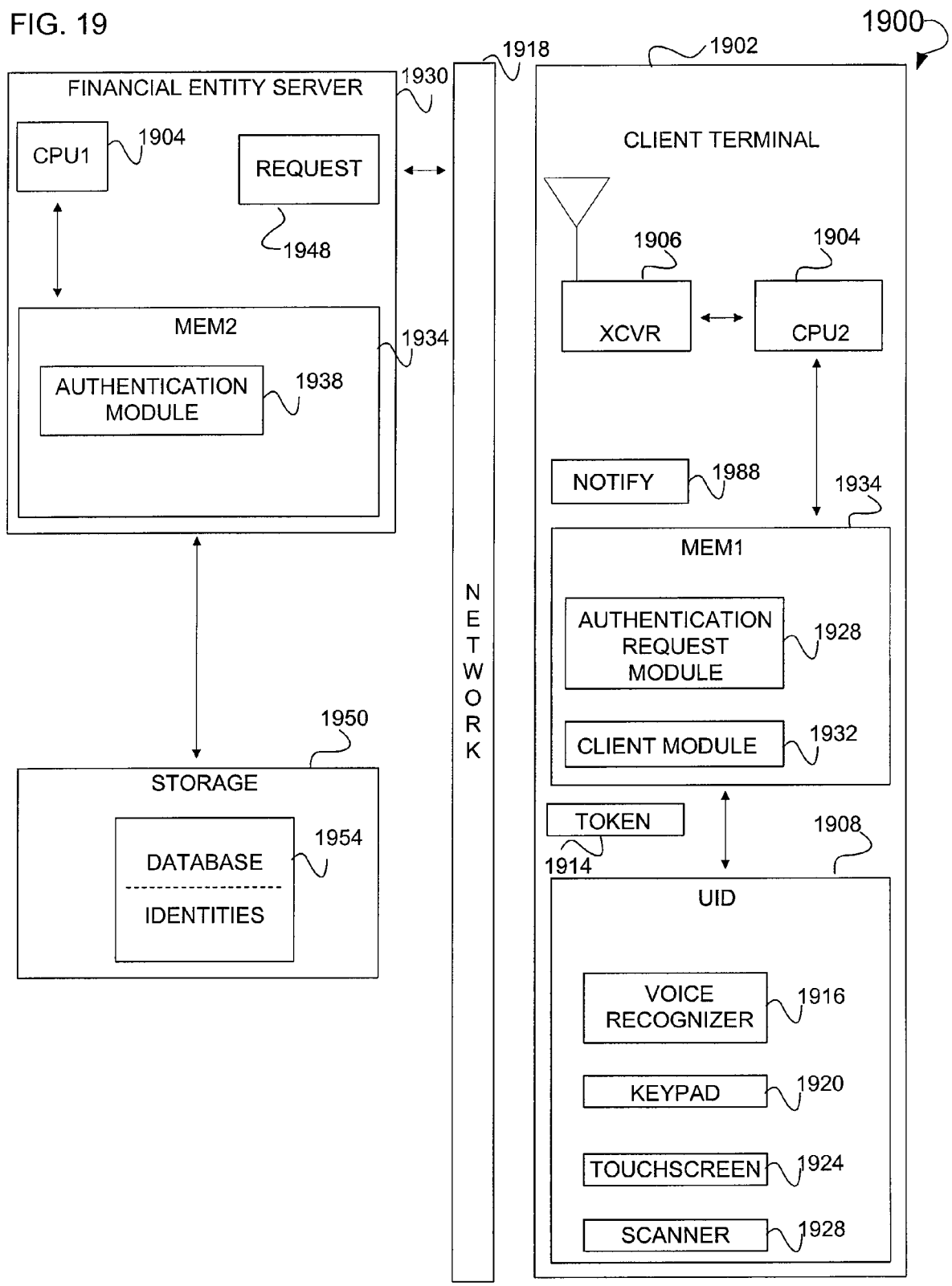
FIG. 19 is a block diagram of an apparatus and systems, according to various example embodiments, which utilizes a token in the transaction of online commerce.

FIG. 19 is a block diagram of an example apparatus 1900 according to various embodiments of the system and method. Illustrated is an apparatus 1902 that can take many forms, such as an Automated Teller Machine, a cellular telephone, a desktop computer terminal with Internet access, a Point Of Sale (POS) terminal, etc.

In some embodiments, the apparatus 1902 may comprise one or more user input devices 1908, such as a voice recognition processor 1916, a keypad 1920, a touch screen 1924, a scanner 1926, a thumbwheel, a button, etc. In some embodiments, a POS terminal may be used to house the user input device 1908.

The apparatus 1902 may include a client module 1932 to communicatively couple to a server (e.g., server 1930) at a financial entity. The apparatus 1902 may also comprise an authentication request module 1928 to receive a token 1914 presented by a customer, to transmit a request 1948 to the financial entity (e.g., represented by the server 1930) to authenticate the customer purporting to be a particular account holder, and to receive notification 1958, from the financial entity, that the customer is authenticated as the account holder based on matching the token 1914 to an identity that has been registered with the financial entity and is uniquely associated with the account holder.

Other embodiments may be realized. For example, a system 1910 may include one or more apparatus 1902. The system 1910 may also include a server 1930 to communicatively couple to a global computer network 1918 (e.g., the Internet), and an authentication module 1938 to receive a request 1948 from a requesting party (e.g., represented by the client terminal 1902) to authenticate the customer purporting to be a particular account holder. The request 1948 may include the token 1914.

The authentication module 1938 may be used to send notification 1958 that the customer is authenticated as the account holder based on matching the token 1914 to an identity that has been registered with a financial entity and is uniquely associated with the account holder. For example, the server 1930 may be located within a bank that has many individual account holders, each registered so that identity authentication tokens 1914 may be generated on their behalf.

As noted previously, the terminal 1902 may comprise a POS terminal associated with the requesting party, wherein the POS terminal is to receive the token 1914, and to be operatively coupled to the server 1930. In some embodiments, the system 1910 may comprise a storage device 1950 to couple to the server 1930 and to store a database 1954 having a plurality of registered identities, including the identity of the account holder whose identity is being authenticated.

Figure 20:
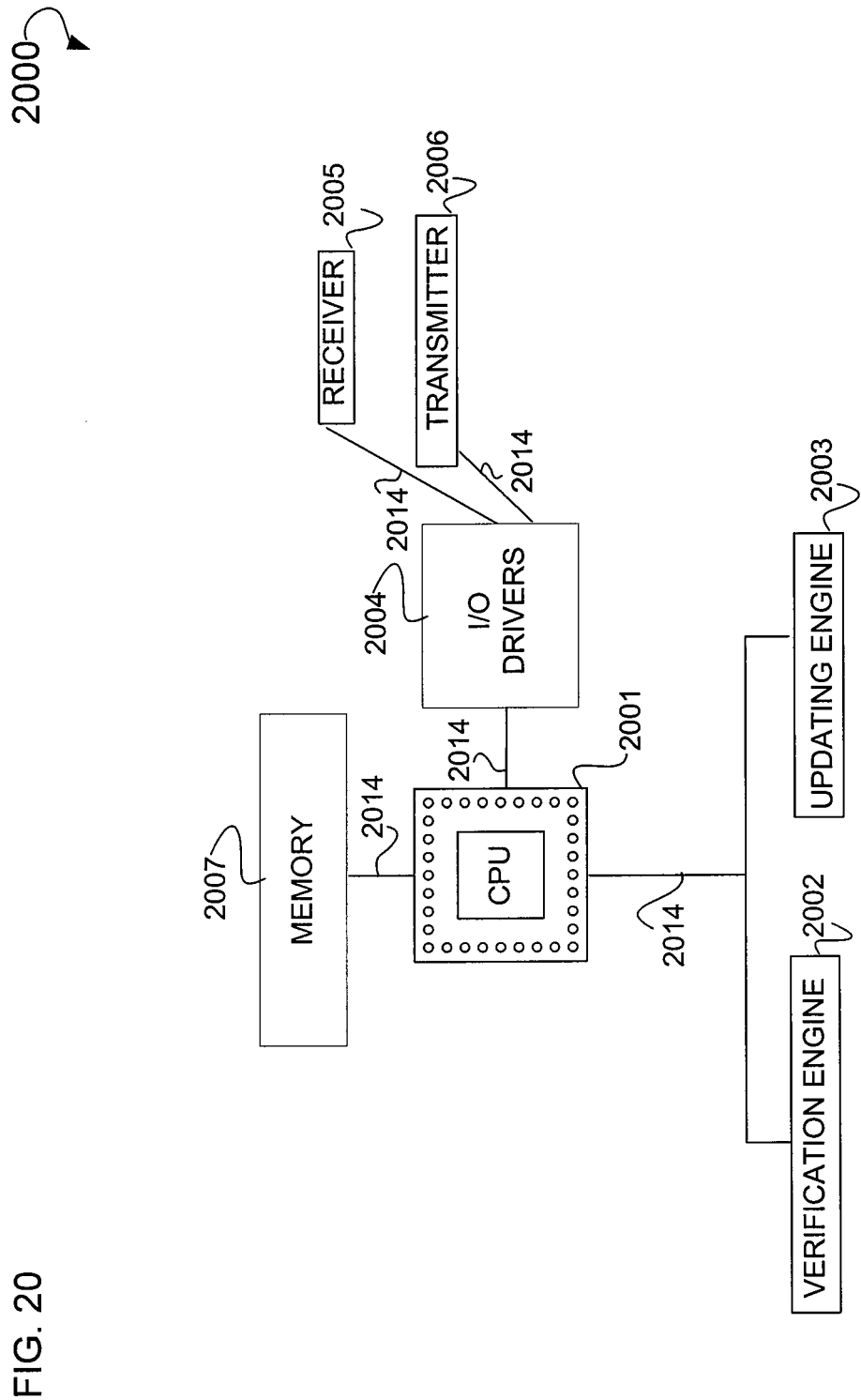
FIG. 20 is a block diagram of a computer system, according to an example embodiment, used to verify a depository financial institution account holder's identity in a transaction involving EFT.

FIG. 20 is a block diagram of an example computer system 2000 used to verify a depository financial account holder's identity in a transaction involving EFT. The blocks shown herein may be implemented in software, firmware, or hardware. These blocks may be directly or indirectly operatively coupled via a physical or logical connection. The computer system 2000 may be the depository financial institution server 112 shown in FIG. 2. Shown in FIG. 20 are blocks 2001 through 2007, and 2014. Illustrated is a CPU 2001 operatively coupled to a memory 2007, a verification engine 2002 and updating engine 2003 via buses 2014. Further, the CPU 2001 is operatively coupled to an I/O driver 2004 via buses 2014. Operatively coupled to the I/O driver 2004 are a receiver 2005 and a transmitter 2006. In some example embodiments, the receiver 2005 receives an account holder verification request to verify a financial entity account holder's identity in a commercial transaction that includes a use of an EFT. A verification engine 2002 is implemented to verify a key value associated with the financial entity account holder's identity in the commercial transaction that includes the use of EFT. A transmitter 2003 is implemented to transmit a confirmation of the financial entity account holder's identity to allow the account holder to consummate the commercial transaction that includes the use of the EFT. The updating engine 2003 is implemented to update a financial entity account associated with the account holder with at least one of an additional key value or a device identifier value. In some example embodiments, the key value is used as part of at least one of a PKI, or a PGP web of trust. Additionally, in some example embodiments, the key value is at least one of an asymmetric key value or symmetric key value. Further, in some example embodiments, the computer system is a financial entity server. In some example embodiments, the verifying of the key value associated with the financial entity account holder's identity includes a retriever to retrieve a key value entry from a data store, the key value entry provided by the account holder. Additionally, the verifying of the key value involves the use of a comparison engine to compare the key value entry to the key value.

Figure 21:
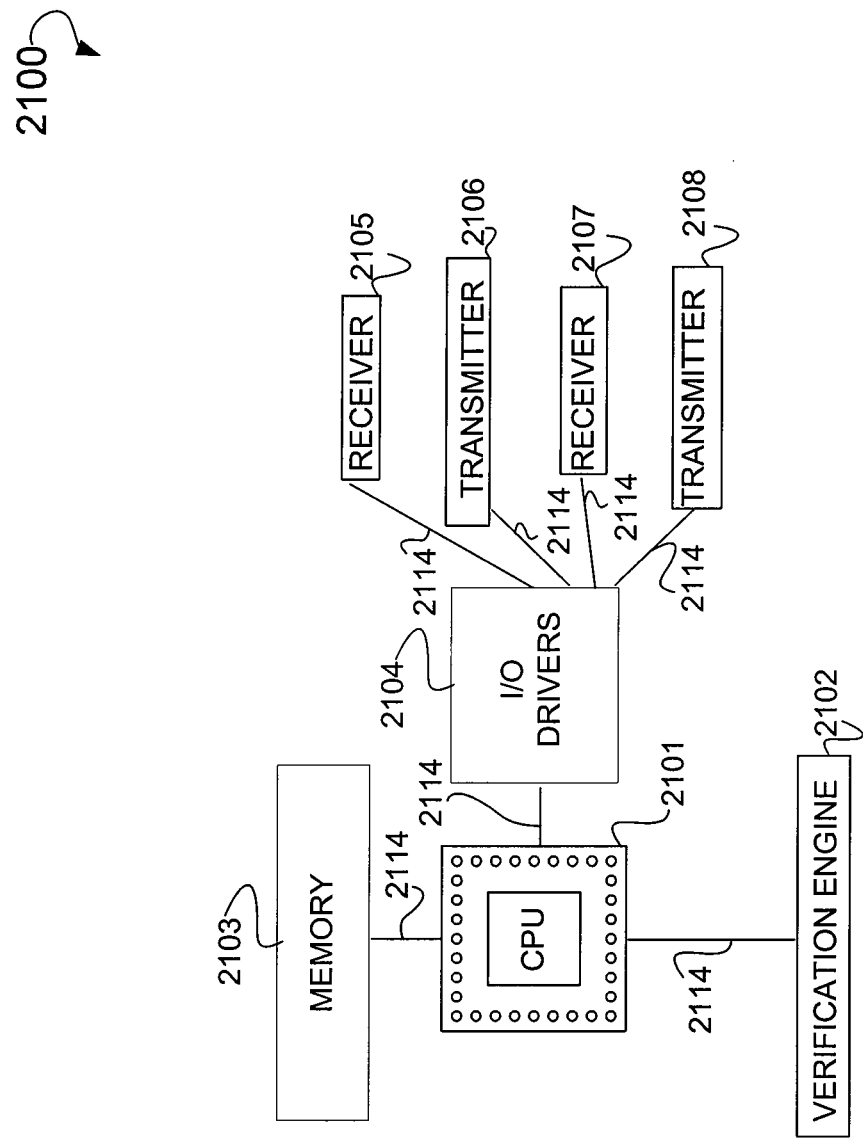
FIG. 21 is a block diagram of a computer system, according to an example embodiment, used to process a service request that includes using a depository financial institution account holder's verified identity to facilitate the use of EFT.

FIG. 21 is a block diagram of an example computer system 2100 used to process a service request that includes using an account holder's verified identity to facilitate the use of EFT. The blocks shown herein may be implemented in software, firmware, or hardware. These blocks may be directly or indirectly operatively coupled via a physical or logical connection. The computer system 2100 may be the financial network server 205 shown in FIG. 2. Shown in FIG. 21 are blocks 2101 through 2108, and buses 2114. Illustrated is a CPU 2101 operatively coupled to a memory 2103, a verification engine 2102 and I/O drivers 2104 via buses 2114. Operatively coupled to the I/O drivers 2104, via buses 2114, is a receiver 2105 and 2107, and transmitter 2106 and 2108. In some example embodiments, the receiver 2105 receives a service request that identifies an EFT account holder in a commercial transaction that includes a use of an EFT. The verification engine 2102 to verify an EFT account number associated with the service request, the verification provided by a financial entity with which the EFT account holder has an account. The transmitter 2103 transmits an account holder verification request to verify that the account holder can participate in the commercial transaction that includes the use of EFT. In some example embodiments, the service request is an SSO service request. The receiver 2104 receives a confirmation of the EFT account holder's identity, the confirmation including a token verifying the EFT account holder's identity. The transmitter 2105 transmits a confirmation of the EFT account holder's identity, the confirmation including the token. In some example embodiments, the service request includes at least one of an EFT account number, or key value.

Figure 22:
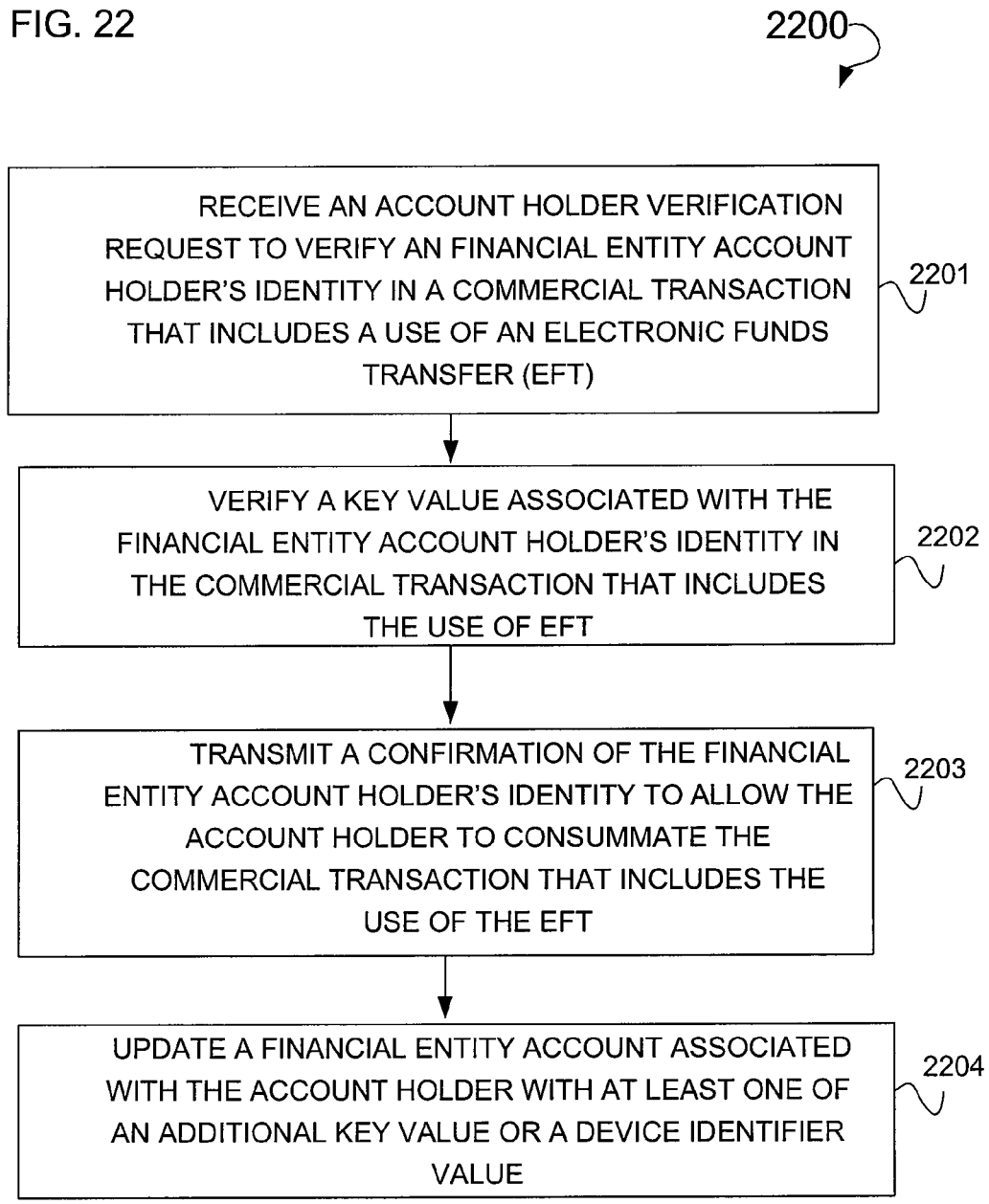
FIG. 22 is a flow chart illustrating an method, according to an example embodiment, used to verify a depository financial institution account holder's identity in a transaction involving EFT.

FIG. 22 is a flow chart illustrating an example method 2200 used to verify an account holder's identity in a transaction involving EFT. Shown in FIG. 22 are various operations 2201 through 2204 that may be executed on the devices 112 shown in FIG. 1. An operation 2201 is shown that is executed by the receiver 2005 in FIG. 20 to receive an account holder verification request to verify a financial entity account holder's identity in a commercial transaction that includes a use of an EFT. Operation 2202 is executed by the verification engine 2002 in FIG. 20 to verify a key value associated with the financial entity account holder's identity in the commercial transaction that includes the use of EFT. Operation 2203 is executed by the transmitter 2006 in FIG. 20 to transmit a confirmation of the financial entity account holder's identity to allow the account holder to consummate the commercial transaction that includes the use of the EFT. Operation 2204 is executed by the updating engine 2003 in FIG. 20 to update a financial entity account associated with the account holder with at least one of an additional key value or a device identifier value. In some example embodiments, the key value is used as part of at least one of a PKI, or a PGP web of trust. In some example embodiments, the key value is at least one of an asymmetric key value or symmetric key value. In some example embodiments, the verifying of the key value associated with the financial entity account holder's identity includes retrieving a key value entry from a data store, the key value entry provided by the account holder. Further, this verifying includes comparing the key value entry to the key value.

Figure 23:
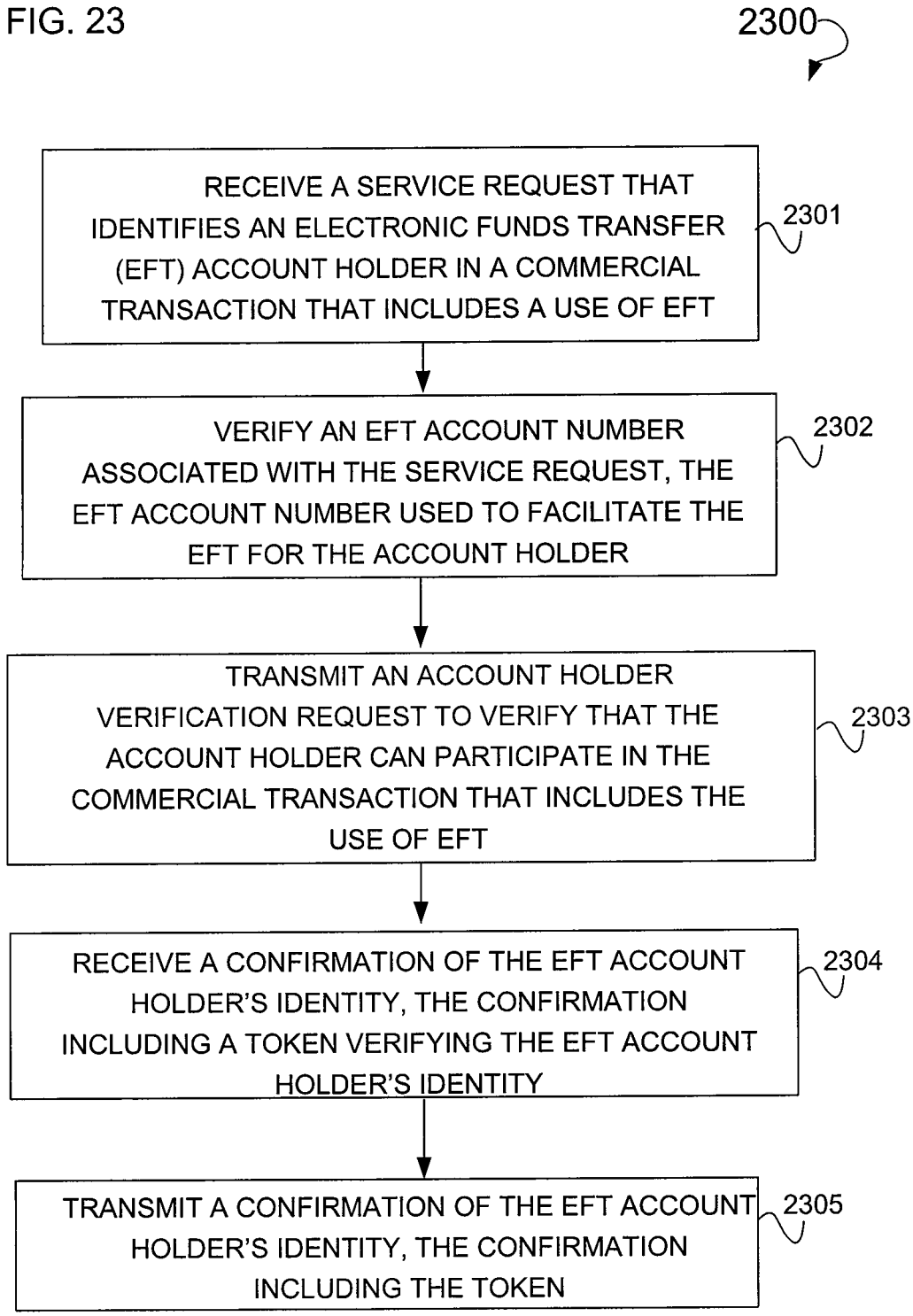
FIG. 23 is a flow chart illustrating an method, according to an example embodiment, used to process a service request that includes using a depository financial institution account holder's verified identity to facilitate the use of EFT.

FIG. 23 is a flow chart illustrating an example method 2300 used to process a service request that includes using a financial entity account holder's verified identity to facilitate the use of EFT. Shown in FIG. 23 are various operations 2301 through 2305 that may be executed on the devices 102 shown in FIG. 2. An operation 2301 is shown that is executed by the receiver 2105 in FIG. 21 to receive a service request that identifies an EFT account holder in a commercial transaction that includes a use of EFT. Operation 2302 is executed by the verification engine 2102 in FIG. 21 to verify an EFT account number associated with the service request, the verification provided by a financial entity with which the EFT account holder has an account. Operation 2303 is execute by the transmitter 2106 in FIG. 21 to transmit an account holder verification request to verify that the account holder can participate in the commercial transaction that includes the use of EFT. In some example embodiments, the service request is a SSO service request. Operation 2304 is executed by the receiver 2107 in FIG. 21 to receive a confirmation of the EFT account holder's identity, the confirmation including a token verifying the EFT account holder's identity. Operation 2305 is executed by the transmitter 2108 in FIG. 21 to transmit a confirmation of the EFT account holder's identity, the confirmation including the token. In some example embodiments, the service request includes at least one of an EFT account number, or key value.

Figure 24:
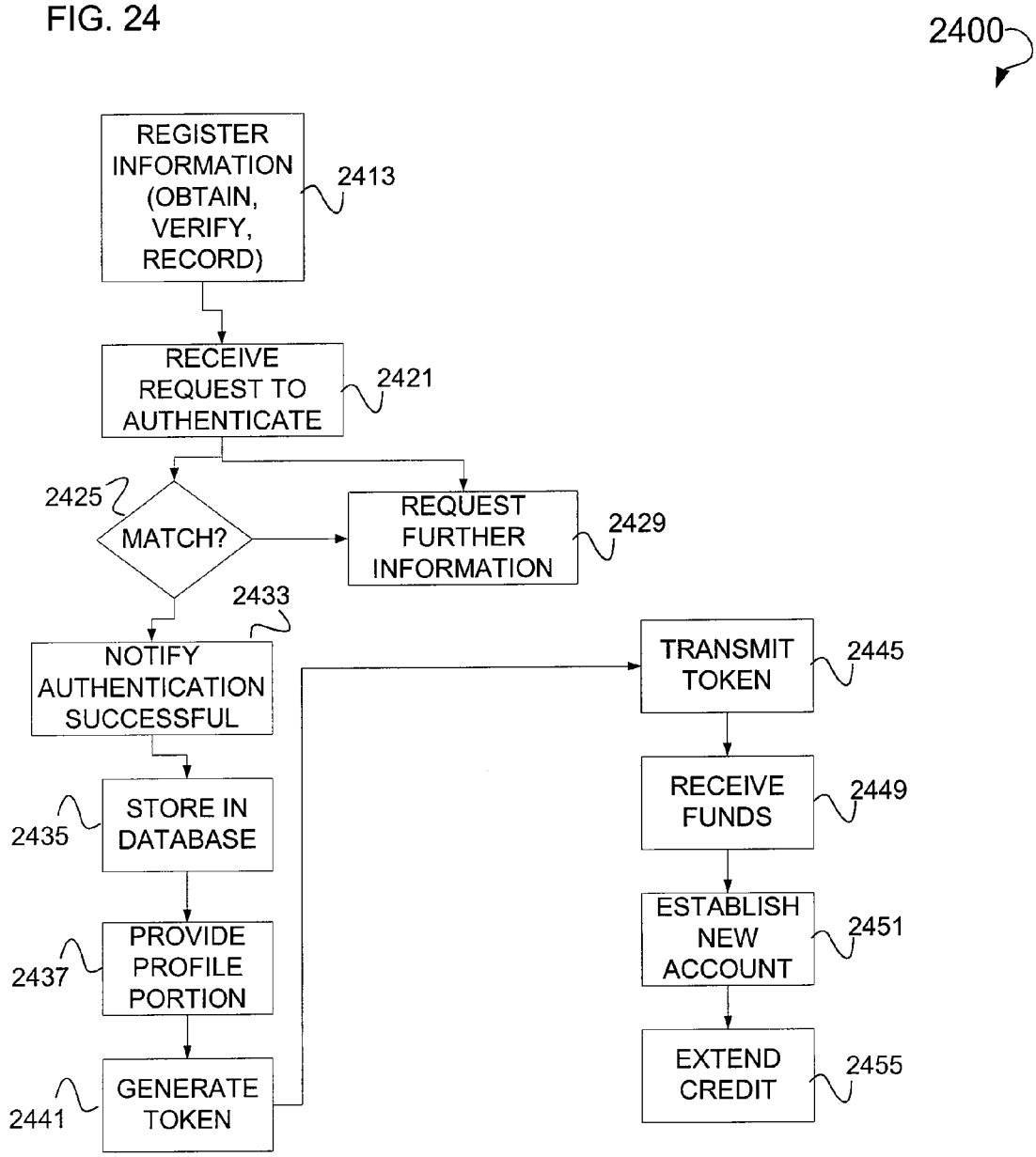
FIG. 24 is a flow diagram illustrating method, according to example embodiments, for authentication.

FIG. 24 is a flow diagram illustrating an example method 2400 according to various embodiments of the system and method. For example, a computer-implemented method 2400 may begin at block 2413 with registering one time, at an authenticating entity, information comprising an identity uniquely associated with an account holder having a financial account held by the financial entity.

Registering at block 2413 may include obtaining, verifying, and recording the information according to customer identification program (CIP) requirements, Know Your Customer (KYC) requirements, Know Your Business (KYB) requirements, and watch-list scanning requirements. Such requirements are well-known to those of ordinary skill in the art. The information may comprise one or more of the name of the account holder, the birth date of the account holder, the physical address associated with the account holder, and/or an identification number associated with the account holder (e.g., social security number, hash-coded identification number). Registering may also comprise obtaining, verifying, and recording a prior verification associated with the customer by the financial entity against Customer Identification Program (CIP) requirements, Know Your Customer (KYC) requirements, Know Your Business (KYB) requirements and watch-list scanning requirements, for example.

The method 2400 may continue on to block 2421 with receiving a request at the authenticating entity from a requesting party that has been presented with a token to authenticate a customer purporting to be a particular account holder. The requesting party may comprise a vendor, another financial entity, a brokerage, a lender, a car lot, an online auction provider, etc. Receiving the request may include receiving a message from the requesting party at the authenticating entity via a global computer network (e.g., the Internet).

At this point, an attempt is made to match the token presented to the identity of the account holder. Thus, the method 2400 may include at block 2425 authenticating, by the authenticating entity, such as a bank or other financial entity, the customer as the account holder by matching a token presented by the customer to the identity uniquely associated with the account holder. If no match is determined at block 2425, the method 2400 may include requesting, if the authenticating is not successful, additional information from the customer at block 2429. One or more additional attempts, perhaps limited in number by the authenticating entity, may be made to authenticate the identity of the account holder by matching the token with the identity at 2425.

If authentication succeeds at block 2425, the method 2400 may include notifying the requesting party that the customer has been authenticated as the account holder by sending a message (e.g., an email message) to the requesting party, perhaps via a global computer network, at block 2433. For example, the method 2400 may include sending a message to a mobile device associated with the customer that the authenticating has been successful. This mobile device may also be used to present the token for authentication, perhaps by transmitting it electronically, or by displaying a bar code image on its display screen (e.g., a PDA or cellular phone display).

The method 2400 may go to include, at block 2435, storing the information in an authentication database. For security reasons, the authentication database may be linked to, but physically separate from, a database of accounts including a financial account associated with the account holder whose identity is being authenticated.

At this point, the method 2400 may include providing to the requesting party a portion of a profile associated with the account holder, which the account holder previously authorized the financial entity to share (e.g., name, physical address, social security number, email address, telephone number, etc.).

In some embodiments, the method 2400 includes generating one or more tokens by a financial entity (or any other authentication entity) upon request by the account holder at block 2441. Generating tokens at block 2441 may include generating tokens having: one or more of an expiration time period after which presentation of the token by the customer is ineffective; a selected number of requesting parties to which the token may be presented; a selected number of times the token may be presented; and named requesting parties to whom the token may be presented. Other limitations may be imposed.

The method 2400 may go on to block 2445 with transmitting the token to the account holder. Transmitting may comprise sending an email message, perhaps including the token, to the account holder.

In some embodiments, the method 2400 may include receiving funds from a customer, such as, an amount associated with a transaction, or some other amount, at block 2449. Thus, for example, the method 2400 may include establishing a new account at a bank associated with an authenticated account holder to hold the funds without receiving any further information from the customer at block 2451. That is, a new account may be opened at a financial entity that is not the authenticating entity, solely on the basis of authenticating the identity of an account holder using a token. Another example includes receiving an amount associated with a transaction associated with a vendor at block 2449, and substantially simultaneously extending credit at block 2455 to the customer by the authenticating entity (e.g., a financial entity), on behalf of the vendor, based on authenticating the identity of a particular account holder, using the token.

Figure 25:
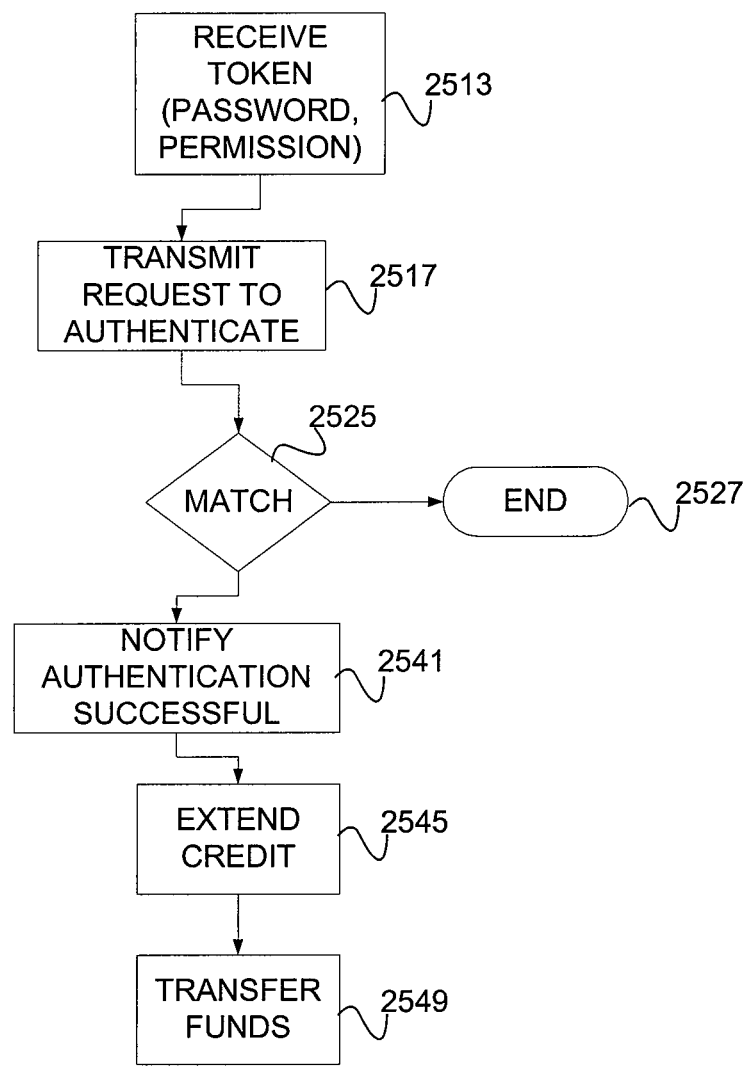
FIG. 25 is a flow diagram illustrating additional methods, according to various example embodiments, for password verification.

FIG. 25 is a flow diagram illustrating an additional example method 2500 according to various embodiments of the system and method. In some embodiments, a computer-implemented method 2500 may begin at block 2513 with receiving a token presented by a customer, which may in turn comprise receiving a password entry at a terminal, for example. At substantially the same time the token is received, permission to share selected information from the profile associated with the customer may also be received. Such permission may be entered by the customer into the same terminal as that used to receive the token. Thus, receiving at block 2513 may include receiving the token in conjunction with permission to receive additional information associated with the account holder. In this way, the customer has the option, in some embodiments, of permitting additional information to be shared with the vendor, even after a token is generated. Such additional information might include one or more of the name of an authenticated account holder, the birth date of the account holder, the physical address associated with the account holder, and an identification number associated with the account holder (e.g., driver's license or other license number associated with the account holder).

The method 2500 may go on to include transmitting a request to an authenticating entity, such as a financial entity, to authenticate the customer purporting to be a particular account holder at block 2517. At this point, an attempt is made to match the token to the identity registered for the account holder at the authenticating entity.

If a match between the token and the identity is not obtained at block 2525, then the method 2500 may terminate at block 2527. Of course, repeated attempts to authenticate may also occur, as shown in FIG. 24.

If the token is found to match the identity at block 2525, then the method 2500 may include receiving notification from the financial entity (or other authenticating entity) at block 2541, that the customer is authenticated as the account holder based on matching the token to an identity that has been registered with the financial entity and is uniquely associated with the account holder.

In some embodiments, if the requesting party is a vendor, for example, the method 2500 may include substantially simultaneously extending credit to the customer by the vendor, responsive to the authenticating, at block 2545. In some embodiments, the method 2500 may include automatically transferring an amount to be paid from an account associated with the account holder and held by the financial entity (e.g., credit card account at the authenticating entity) directly to an account associated with the requesting party. This is what might occur when purchases are made online or in a store, for example.

The methods 2400, 2500 described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Thus, other embodiments may be realized, including a machine-readable medium (e.g., the memories 1934 of FIG. 19) encoded with instructions for directing a machine to perform operations comprising any of the methods described herein. For example, some embodiments may include a machine-readable medium encoded with instructions for directing a client terminal or server to perform a variety of operations. Such operations may include any of the activities presented in conjunction with the methods 1111, 2500 described above.

Figure 26:
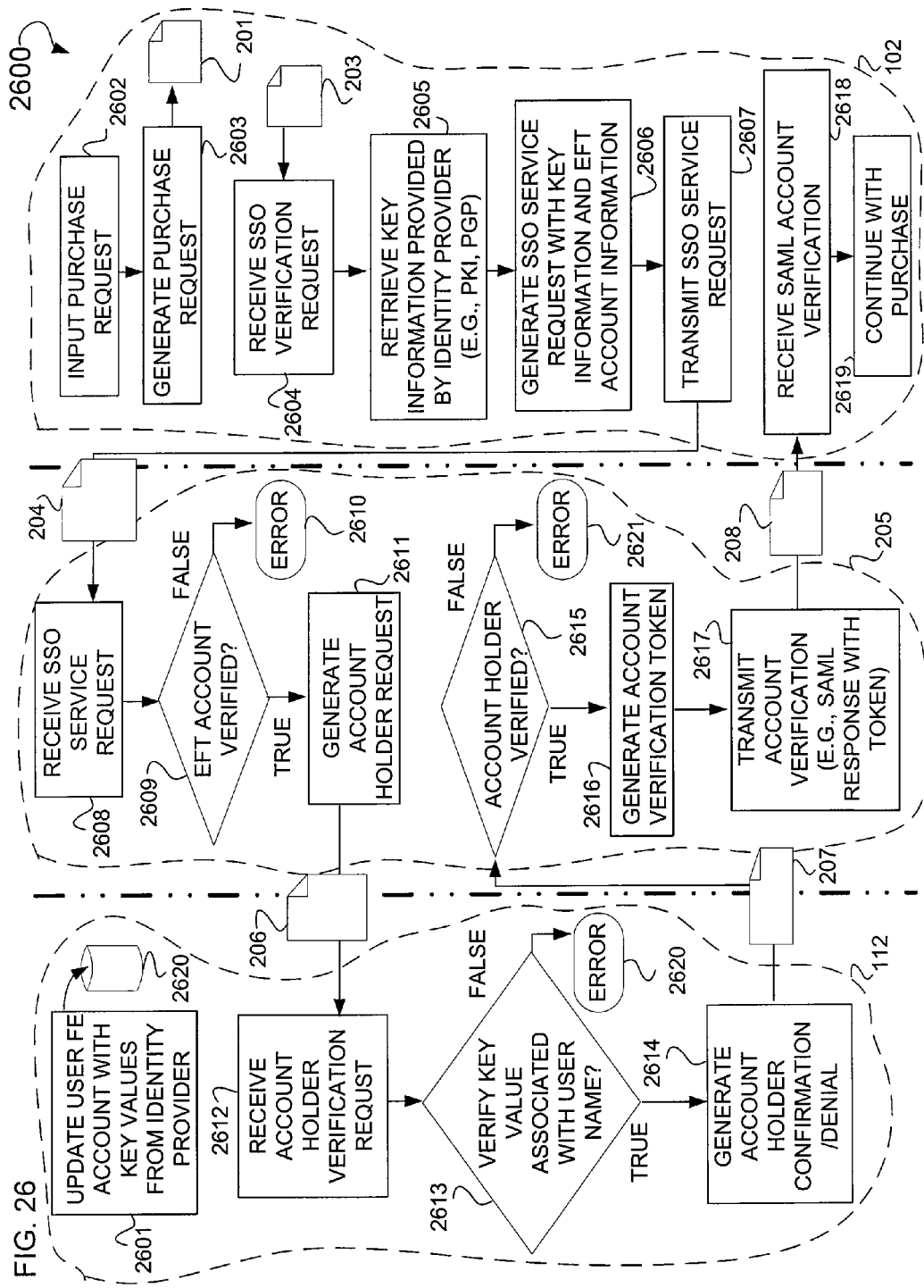
FIG. 26 is a tri-stream flow chart illustrating an method, according to an example embodiment, to verify an EFT account holder identity through the use of a financial entity server.

FIG. 26 is a tri-stream flow chart illustrating an example method 2600 to verify an EFT account holder identity through the use of a financial entity server. Shown are operations 2601 and 2612 through 2614 that are executed by the depository financial institution server 112. Further illustrated are operations 2608 through 2611, and 2615 through 2617 that are executed by the financial network server 205. Additionally shown are operations 2602 through 2607, and 2618 through 2619 that are executed by the device 102. Operation 2601 is executed to update a financial entity account with key values from an identity provider. A financial entity account is held by, for example, a user of the terminal 109 who also holds a EFT account on the financial network server 205. This update is then stored into a database 2620. An identity provider may include a PKI or a PGP web of trust, wherein either of these identity providers generate and provide a symmetric or asymmetric key value that is used to update the database 2620. Operation 2602 is executed to receive input in the form of the purchase request 201. An operation 2603 is executed to generate this purchase request 201. Operation 2604 is executed to receive the SSO verification 203 in response to the purchase request 201. An operation 2605 is executed to retrieve key information provided by the identity provider. This key information includes an asymmetric or symmetric key. Operation 2606 is executed to generate the SSO service request where this SSO service request may include the key information and EFT account information. Operation 2607 is executed to transmit this SSO service request in the form of the SSO service request 204 that is then received through the execution of operation 2608. Decisional operation 2609 is executed that determines whether an EFT account is verified or otherwise exists and further whether this EFT account is associated with the user utilizing the device 102. In cases where decisional operation 2609 evaluates to "false," an error condition 2610 is executed. In cases where decisional operation 2609 evaluates to "true," an operation 2611 is executed. Operation 2611 is executed to generate an account holder request in the form of the account holder verification request 206. This account holder verification request 206 is received through the execution of operation 2612. A decisional operation 2613 is executed to determine whether the verified key value is associated with a particular user name or account holder name. In cases where decisional operation 2613 evaluates to "false," an error condition 2620 is executed. In cases where decisional operation 2613 evaluates to "true," an operation 2614 is executed. Operation 2614 is executed to generate an account holder confirmation or denial 207. This account holder confirmation or denial 207 is received by the financial network server 205, where a decisional operation 2615 is executed. Decisional operation 2615 determines whether the account holder has been verified as an account holder within the financial entity as verified by the depository financial institution server 112. In cases where decisional operation 2615 evaluates to "false," a termination condition 2621 is executed. In cases where decisional operation 2615 evaluates to "true," an operation 2616 is executed. Operation 2616 generates an account verification token. An operation 2617 is executed that transmits the account verification 208 to be received through the execution of operation 2618. The account verification 208 may be a SAML response with token. Operation 2618, when executed, receives the account verification. An operation 2619 is execute to allow the user utilizing the device 102 to continue with a purchase where their association with a particular EFT account and their association with a particular financial network account has been verified. The depository financial institution server 112 acts to vouch or otherwise confirm the identity of the party utilizing the device 102 for the purposes of consummating a transaction involving the user of EFT.

Figure 27:
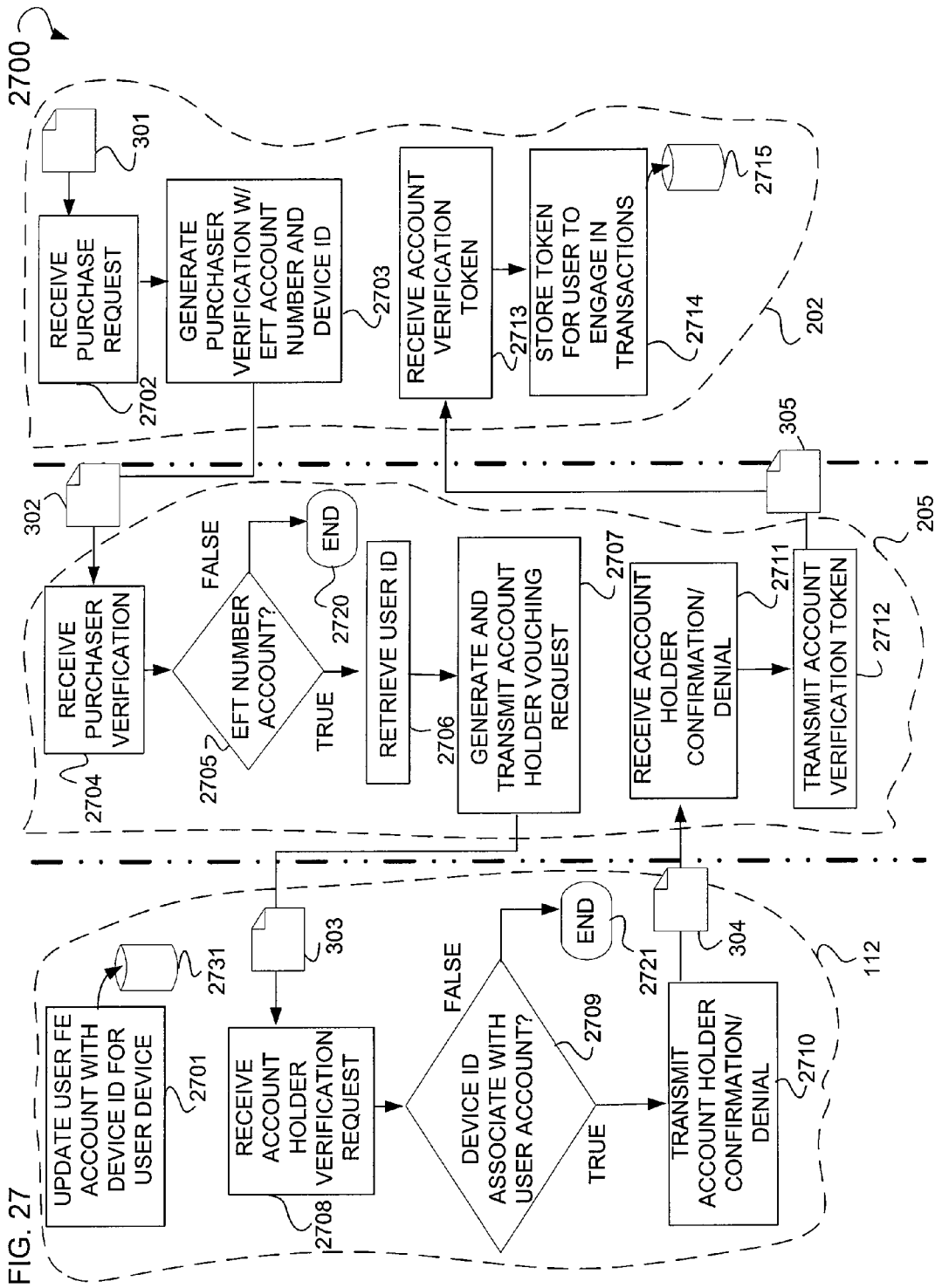
FIG. 27 is a tri-stream flow chart illustrating an method, according to an example embodiment, to verify an EFT account holder identity through the use of a back-channel exchange between a merchant/merchant aggregation server and an financial network server.

FIG. 27 is a tri-stream flow chart illustrating an example method 2700 to verify an EFT account holder identity through the use of a back-channel exchange between a merchant server and an interbank network server. Shown is an operation 2701, and 2708 through 2710 that are executed by the depository financial institution server 112. Also shown are operations 2705 through 2707, and 2711 through 2712 that are executed by the depository financial institution server 112. Additionally shown are operations 2702 through 2703, and 2713 through 2714 that are executed by the merchant/merchant aggregator server 202. Operation 2701 is executed to update a user financial network account with a device ID for a particular user device. This update is stored into the database 2731. Operation 2702 is executed to receive a purchase request 301. An operation 2703 is executed to generate a purchaser verification request that includes an EFT account number and a device ID associated with the device 102. This purchaser verification request 302 is received through the execution of operation 2704. A decisional operation 2705 is executed to determine whether or not the account number associated with the purchaser verification request 302 is valid. In cases where decisional operation 2705 evaluates to "false," a termination condition 2720 is executed. In cases where decisional operation 2705 evaluates to "true," an operation 2706 is executed.

In some example embodiments, operation 2706 is executed to retrieve a user ID based upon the EFT account number. A user name may be a user ID. An operation 2707 is executed to generate and transmits an account holder verification request 303. Operation 2708 is executed to receive the account holder verification request 303. Decisional operation 2709 is executed to determine whether a device ID contained within the account holder verification request 303 is valid and associated with a particular user account that is further associated with the depository financial institution server 112. In cases where decisional operation 2709 evaluates to "false," a termination condition 2721 is executed. In cases where decisional operation 2709 evaluates to "true," an operation 2710 is executed. Operation 2710 is executed to transmit an account holder confirmation or denial 304 that is received through the execution of operation 2711. Operation 2712 is executed to transmit an account verification where this account verification includes a token that will allow the user utilizing the device 102 to continue with the transaction (e.g., a purchase or sale of a good or service). Alternatively, the account verification includes a denial denying the user of the device 102 the ability to continue with the transaction. Operation 2713 is executed to allow for the receiving of the account verification with token or denial 305. An operation 2714 is executed to store the token for the user utilizing the device 102 to allow that user to consummate an existing transaction or engage in future transactions. This token is stored into a data store 2715 where this data store 2715 may be a native or non native data store.

Figure 28:
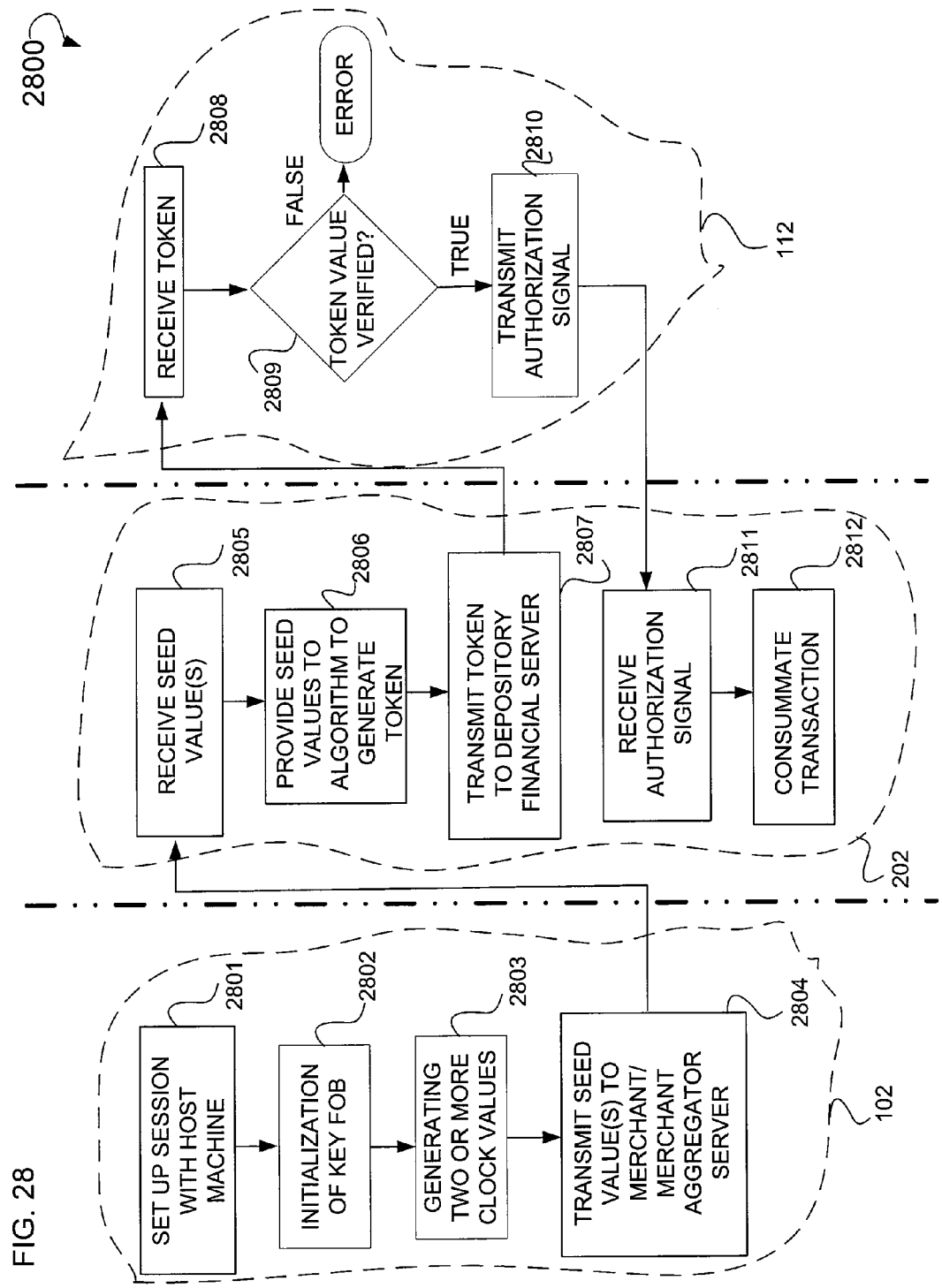
FIG. 28 is a tri-stream flow chart illustrating an method, according to an example embodiment, to verify a seed value generated by a dual TRBE key fob for the purpose of consummating a transaction between a merchant and an account holder.

FIG. 28 is a tri-stream flow chart illustrating an example method 2800 to verify a seed value generated by a dual TRBE key fob 1700 for the purpose of consummating a transaction between a merchant and an account holder. Illustrated are various operations 2810 through 2804 executed on one or more of the devices 102. Further illustrated are various operations 2805 through 2812 executed on the merchant/merchant aggregator server 202. Additionally, shown are various operations 2808 through 2810 executed on the depository financial server 112. In some example embodiments, an operation 2801 is executed to set up a session with a host machine. A session may be a USB based session wherein the dual TRBE key fob 1700 interfaces with one of the devices 102 such that one of the devices 102 is prompted to set up a Transmission Control Protocol/Internet Protocol (TCP/IP) session with the merchant/merchant aggregator server 202. Though this TCP/IP session seed values generated by the dual TRBE key fob 1700 may be transmitted to the merchant/merchant aggregator server 202 by one of the devices 102. Operation 2802 is executed to initialize the key fob 1700. Operation 2803 is executed to generate two of more clock values. These clock values may be derived from the clock 1803 residing on the dual TRBE key fob 1700. Operation 2804 is executed to initial the TCP/IP session and to transmit one or more of the seed values to the merchant/merchant aggregator server 202. Operation 2805 is executed to receive the one or more seed values from the devices 102. Operation 2806 is executed to provide the one or more seed values to an algorithm that generates a token. This algorithm may be supplied by a particular depository financial institution, and may be specific to such institution. The algorithm may be an encryption algorithm, hashing algorithm, or some other suitable algorithm. Operation 2807 is executed to transmit the token to a depository financial institution server 112. Operation 2808 is executed to receive the token. Decisional operation 2809 is executed to determine whether the token is valid. Validity may be based upon the token valuing falling within a range of token values for a particular algorithm result using a time based seed value. In cases where the decisional operation 2809 evaluates to "false" an error condition is generated. In cases where decisional operation 2809 evaluates to "true" an operation 2810 is executed. Operation 2810, when executed, transmits an authorization signal using a TCP/IP session established between the merchant/merchant aggregator server 202 and the depository financial institution server 112. The signal may be a boolean value. Operation 2811 is executed to receive the authorization signal. Operation 2812 is executed to consummate the transaction between the device 102 and the merchant/merchant aggregator server 202.

Figure 29:
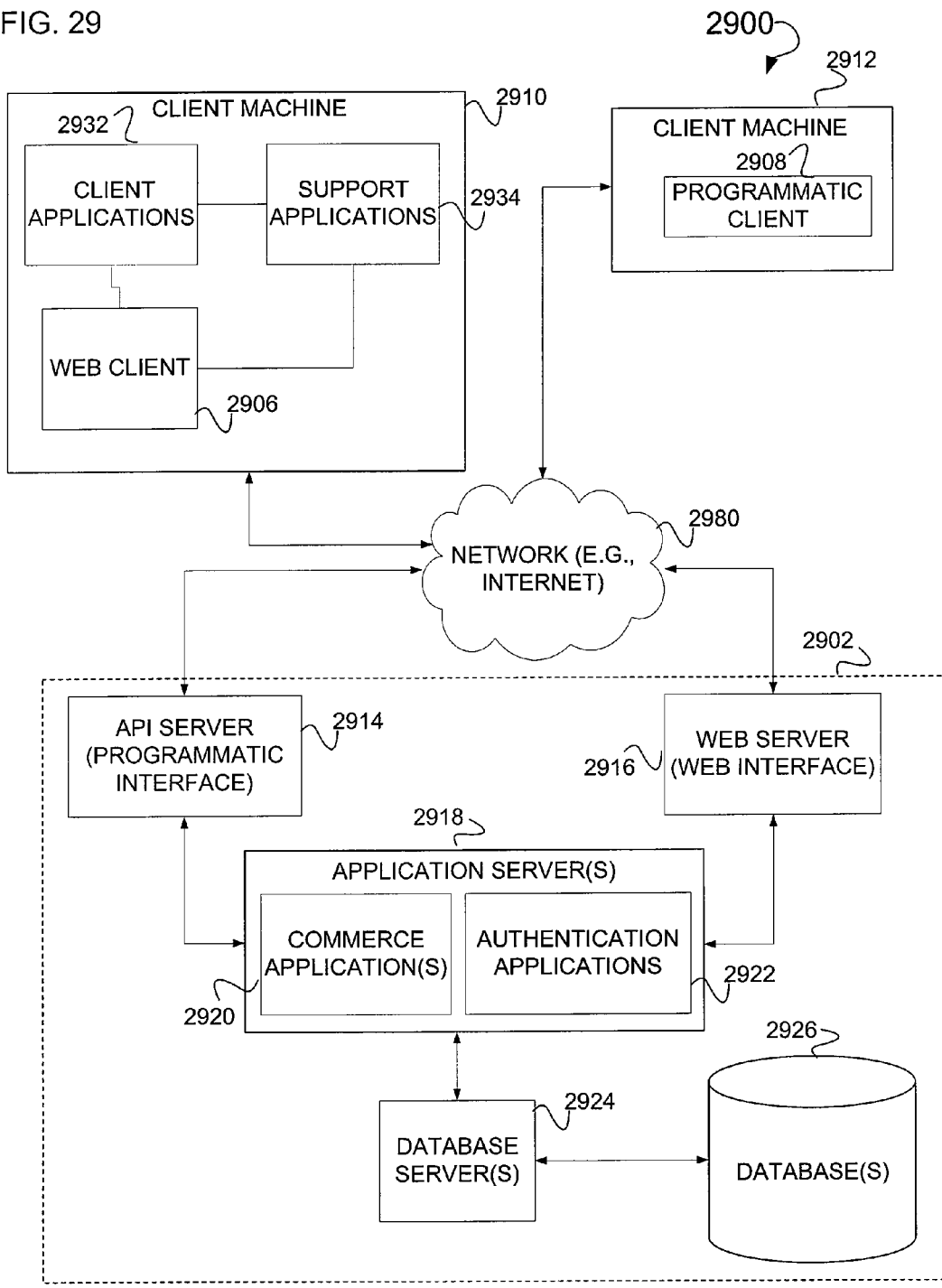
FIG. 29 is a block diagram illustrating a client-server architecture to facilitate authentication according to various example embodiments of the system and method illustrated herein.

FIG. 29 is a block diagram illustrating an example client-server architecture to facilitate authentication according to various embodiments of the system and method. The authentication system 2900 comprises a client-server architecture used for registration, token generation and/or authentication. A financial platform, in the example form of a network-based financial system 2902, provides server-side functionality, via a network 2980 (e.g., the Internet) to one or more clients. FIG. 29 illustrates, for example, a web client 2906 (e.g., a browser, such as the Internet Explorer browser developed by Microsoft Corporation of Redmond, Wash.), and a programmatic client 2908 executing on respective client machines 2910 and 2912. In an example embodiment, either or both of the web client 2906 and programmatic client 2908 may include a mobile device.

Turning specifically to the network-based financial system 2902, an Application Program Interface (API) server 2914 and a web server 2916 are coupled to, and provide programmatic and web interfaces respectively to, one or more application servers 2918. The application servers 2918 host one or more financial applications 2920 and authentication applications 2922 (e.g., similar to or identical to the authentication module 1938 of FIG. 19). The application servers 2918 are, in turn, shown to be coupled to one or more database servers 2924 that facilitate access to one or more databases 2926, such as registries that include links between account holders, their identity information, and/or financial entity accounts.

The financial applications 2920 provide a number of financial functions and services to users that access the network-based financial system 2902. The authentication applications 2922 facilitate authenticating tokens presented by registered account holders.

Further, while the authentication system 2900 shown in FIG. 29 employs a client-server architecture, the present application is of course not limited to such an architecture, and could equally well find application in a distributed, or peer-to-peer, architecture system. The various financial and authentication applications 2920 and 2922 may also be implemented as standalone software programs, which do not necessarily have networking capabilities.

The web client 2906, it will be appreciated, may access the various financial and authentication applications 2920 and 2922 via the web interface supported by the web server 2916. Similarly, the programmatic client 2908 accesses the various services and functions provided by the financial and authentication applications 2920 and 2922 via the programmatic interface provided by the API server 2914. The programmatic client 2908 may, for example, comprise an authentication request module (e.g., similar to or identical to the authentication request module 1928 of FIG. 19) to enable a user to request authentication and to perform batch-mode communications between the programmatic client 2908 and the network-based financial system 2902. Client applications 2932 and support applications 2934 may perform similar or identical functions.

Thus, the authentication system 2900 may provide a number of registration, token generation, and authentication mechanisms whereby a user may receive tokens for authentication by any number of entities. The financial applications 2920 may include one or more account management applications which support and provide services related to various user accounts in a financial entity (e.g. a bank). The various account management applications may also provide a number of features such as supervising account transfers, holding account balances, and keeping tracking of and reporting transactions to relevant applications.

The financial applications 2920 may also include dispute resolution applications to provide mechanisms whereby disputes arising between transacting parties may be resolved. For example, the dispute resolution applications may provide guided procedures whereby the parties are guided through a number of steps in an attempt to settle a dispute. In the event that the dispute cannot be settled via the guided procedures, the dispute may be escalated to a customer service agent for the financial system 2902, third party mediator, or arbitrator.

Some embodiments may include the various databases (e.g., 2620, and 2731) being relational databases, or, in some cases, On Line Analytic Processing (OLAP)-based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 30:
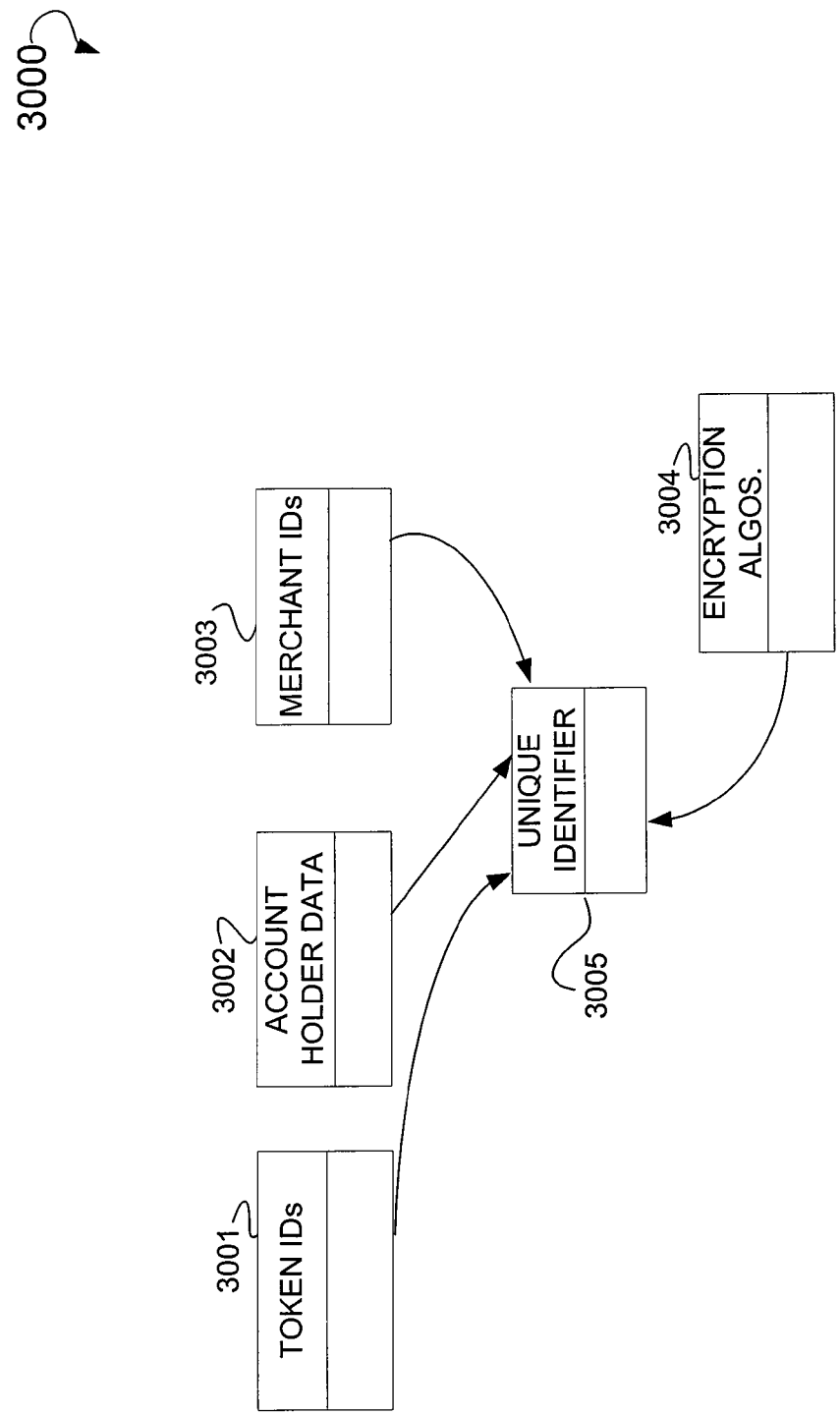
FIG. 30 is a Relational Data Schema (RDS), according to an example embodiment.

FIG. 30 is an example RDS 3000. Shown is a table 3001 that includes token IDs. These token IDs may be stored as an integer, string, or some other suitable data type. A table 3002 is illustrated that includes account holder data. This account holder data may be stored as a string, extensible Markup (XML) data type, or some other suitable data type. A table 3003 is shown that includes merchant IDs. These merchant IDs may be stored as an integer, string or XML data type. In some example embodiments, the token IDs of table 3001 may be mapped, joined, or otherwise reference the merchant IDs of table 3003. A table 3004 is shown that includes encryption algorithms. These encryption algorithms may include hashing algorithms, DES, AES, or other suitable algorithms stored as Binary Large Objects (BLOBs). A table 3005 is shown that includes unique IDs values stored as integers. These unique IDs may be used to uniquely identify each of the entries in the tables 3001 through 3004.

Figure 31:
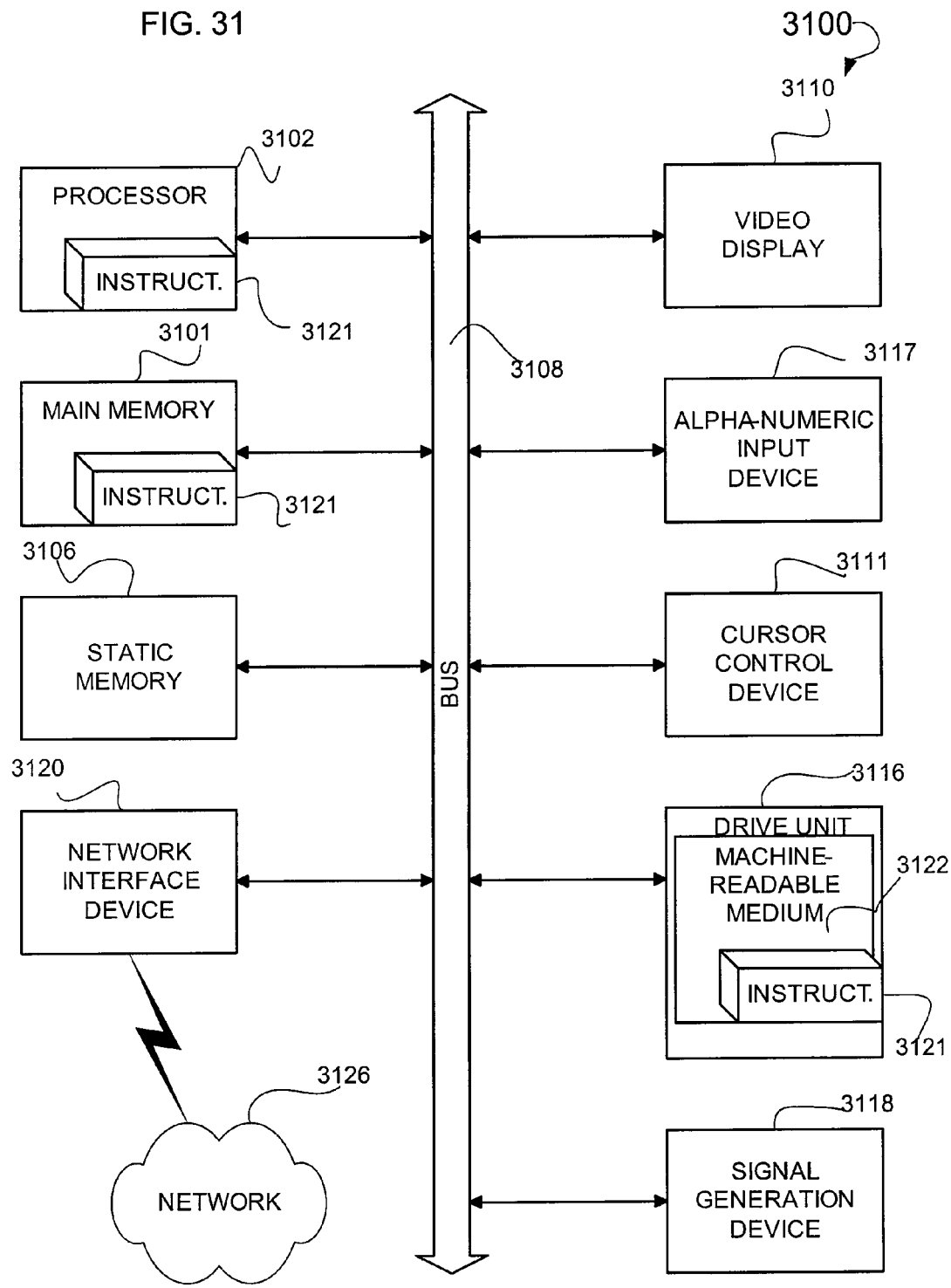
FIG. 31 is a block diagram, illustrating a diagrammatic representation of machine, in the example form of a computer system, within which a set of instructions for causing the machine to perform any one or more of the methodologies discussed herein may be executed.

FIG. 31 is a block diagram, illustrating a diagrammatic representation of machine 3100 in the example form of a computer system within which a set of instructions for causing the machine to perform any one or more of the methodologies discussed herein may be executed. The machine 3100 may also be similar to or identical to the client terminal 1002 or server 1030 of FIG. 10.

In alternative embodiments, the machine 3100 may operate as a standalone device or may be connected (e.g., networked) to other machines. In a networked deployment, the machine 3100 may operate in the capacity of a server or a client machine in a server-client network environment, or as a peer machine in a peer-to-peer (or distributed) network environment.

The machine 3100 may be a server computer, a client computer, a Personal Computer (PC), a Tablet PC, a Set-top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that execute a set (or multiple sets) of instructions to perform any one or more of the methodologies discussed herein.

The example computer system 3100 may include a processor 3102 (e.g., a CPU, a Graphics Processing Unit (GPU) or both), a main memory 3104 and a static memory 3106, all of which communicate with each other via a bus 3108. The computer system 3100 may further include a video display unit 3110 (e.g., Liquid Crystal Displays (LCD) or Cathode Ray Tube (CRT)). The computer system 3100 also may include an alphanumeric input device 3112 (e.g., a keyboard), a cursor control device 3114 (e.g., a mouse), a disk drive unit 3116, a signal generation device 3118 (e.g., a speaker) and a network interface device 3120.

The disk drive unit 3116 may include a machine-readable medium 3122 on which is stored one or more sets of instructions (e.g., software 3124) embodying any one or more of the methodologies or functions described herein. The software 3124 may also reside, completely or at least partially, within the main memory 3104 and/or within the processor 3102 during execution thereof by the computer system 3100, the main memory 3104 and the processor 3102 also constituting machine-readable media. The software 3124 may further be transmitted or received over a network 3126 via the network interface device 3120, which may comprise a wired and/or wireless interface device.

While the machine-readable medium 3122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present system and method. The term "machine-readable medium" shall accordingly be taken to include tangible media that include, but are not limited to, solid-state memories and optical and magnetic media.

The machine 3100 may use various hardware accelerators and security systems as part of the instructions 3124 for performing ciphering and cryptography, including the Rivest-Shamir-Adleman (RSA) security algorithm and cryptography by RSA Security, Inc. located at Bedford, Mass., as well as the El Gamal algorithm by Taher El Gamal. The RSA implementation is also to implement RSA BSAFE implementation, which is a form of hardware accelerator, to support the BSAFE library interface. Alternative solutions include operating system platforms (e.g., OpenBSD) that are securely built into an operating system. The operating system platforms can dedicate a processor in a multiple-way hardware platform and are also configured to use one or more processors in a multi-processor system for cryptographic operations. The machine 3100 may further use decryption and encryption in validating a token's sequence number to prevent other systems or sites from replaying or minting the token authentication module (see module 438 of FIG. 4).

Using the apparatus, systems, and methods disclosed herein may reduce the effort required to verify the identity of account holders at a number of entities, including stores, banks, online auctions, and the like. Increased customer satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein as an "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the preceding detailed description, numerous specific details are set forth to provide a thorough understanding of claimed subject matter. However, it may be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

What is claimed is:

1. A computer-implemented method comprising:
issuing a token to a holder of an account, the account to be used to fund a transaction, the token being pre-assigned to two or more merchant servers by the holder of the account prior to the transaction occurring and to an amount of funds available to fund the transaction by the holder of the account;
receiving a purchase request through an Electronic Payment Financial Network (EPFN), the purchase request including the token;
determining, using one or more processors, that the token is assigned to the two or more merchant servers by mapping the token to a merchant identifier value and comparing the token against the merchant identifier value; and
transmitting, based on the determination, a purchase request authorization authorizing the transaction.

2. The computer-implemented method of claim 1, wherein the purchase request includes at least one of account holder information, a purchase amount, or a seed value.

3. The computer-implemented method of claim 1, wherein the EPFN includes at least one of a payment processor network, Electronic Funds Transfer (EFT) network, or an Automated Clearing House (ACH) network.

4. The computer-implemented method of claim 1, wherein the token includes at least one of a symmetric key, an asymmetric key, a hash value, a digital signature, a pseudo-number, an alpha-numeric value, or a pointer to a location in memory.

5. The computer-implemented method of claim 1, wherein the token is generated from a time based seed value.

6. The computer-implemented method of claim 1, further comprising transmitting an invalidity message where the token and merchant identifier value are not equivalent.

7. The computer-implemented method of claim 1, wherein the transaction includes a transaction in commerce that is conducted by two or more devices communicating over a network.

8. The computer-implemented method of claim 1, wherein the transmitting of the purchase request authorization further comprises passing additional information specified by the holder of the account to the merchant.

9. A computer system comprising:
a first transmitter to transmit a token to a holder of an account, the account to be used to fund a transaction, the token being pre-assigned to a merchant server prior to the transaction occurring and to an amount of funds available to fund the transaction by the holder of the account;
a receiver to receive a purchase request through an Electronic Payment Financial Network (EPFN), the purchase request including the token;
a comparison engine, having one or more processors, to determine that the token is assigned to the merchant server by mapping the token to a merchant identifier value and comparing the token against the merchant identifier value; and
a second transmitter to transmit, based on the determination, a purchase request authorization to authorize the transaction.

10. The computer system of claim 9, wherein the purchase request includes at least one of account holder information, a purchase amount, or a seed value.

11. The computer system of claim 9, wherein the EPFN includes at least one of a payment processor network, Electronic Funds Transfer (EFT) network, or an Automated Clearing House (ACH) network.

12. The computer system of claim 9, wherein the token includes at least one of a symmetric key, an asymmetric key, a hash value, a digital signature, a pseudo-number, an alpha-numeric value, or a pointer to a location in memory.

13. The computer system of claim 9, wherein the token is generated from a time based seed value.

14. The computer system of claim 9, further comprising a third transmitter to transmit an invalidity message where the token and merchant identifier value are not equivalent.

15. The computer system of claim 9, wherein the transaction includes a transaction in commerce that is conducted by two or more devices communicating over a network.

16. A non-transitory machine-readable medium comprising instructions, which when implemented by one or more machines, cause the one or more machines to perform the following operations comprising:
issuing a token to a holder of an account, the account to be used to fund a transaction, tile token being pre-assigned to two or more merchant servers by the holder of the account prior to the transaction occurring and to an amount of funds available to fund the transaction by the holder of the account;
receive a purchase request through an Electronic Payment Financial Network (EPFN), the purchase request including the token;
determine that the token is assigned to the two or more merchant servers by mapping the token to a merchant identifier value and comparing the token against the merchant identifier value; and
transmit, based on the determination, a purchase request authorization authorizing tile transaction.

* * * * *